United States Patent
Chakravarti et al.

(10) Patent No.: US 8,222,347 B2
(45) Date of Patent: Jul. 17, 2012

(54) POLYESTER-POLYCARBONATE COMPOSITIONS

(75) Inventors: Shreyas Chakravarti, Evansville, IN (US); Songping Liao, Shanghai (CN); Dake Shen, Shanghai (CN); Huiping Zhang, Clifton Park, NY (US)

(73) Assignee: Sabic Innovative Plastics IP B.V. (NL)

( * ) Notice: Subject to any disclaimer, the term of this patent is extended or adjusted under 35 U.S.C. 154(b) by 697 days.

(21) Appl. No.: 11/782,675

(22) Filed: Jul. 25, 2007

(65) Prior Publication Data
US 2009/0030129 A1 Jan. 29, 2009

(51) Int. Cl.
*C08L 67/03* (2006.01)
*C08G 18/42* (2006.01)
*C08G 18/44* (2006.01)
*C08G 63/181* (2006.01)
*C08G 63/183* (2006.01)

(52) U.S. Cl. ...... 525/418; 524/604; 528/308; 528/308.6

(58) Field of Classification Search ............... 524/599
See application file for complete search history.

(56) References Cited

U.S. PATENT DOCUMENTS

| | | | |
|---|---|---|---|
| 3,078,254 A | 2/1963 | Zelinski et al. | |
| 3,169,121 A | 2/1965 | Goldberg | |
| 3,265,765 A | 8/1966 | Holden et al. | |
| 3,297,793 A | 1/1967 | Dollinger | |
| 3,402,159 A | 9/1968 | Hsieh | |
| 3,405,198 A | 10/1968 | Obernburg et al. | |
| 3,594,452 A | 7/1971 | De La Mare et al. | |
| 3,769,260 A | 10/1973 | Segal | |
| 3,864,428 A | 2/1975 | Nakamura et al. | |
| 4,119,607 A | 10/1978 | Gergen et al. | |
| 4,125,572 A | 11/1978 | Scott | |
| 4,172,859 A | 10/1979 | Epstein | |
| 4,188,314 A | 2/1980 | Fox et al. | |
| 4,264,487 A | 4/1981 | Fromuth et al. | |
| 4,292,233 A | 9/1981 | Binsack et al. | |
| 4,327,764 A | 5/1982 | Biederman et al. | |
| 4,364,280 A | 12/1982 | Kutsay | |
| 4,391,954 A | 7/1983 | Scott | |
| 4,487,896 A | 12/1984 | Mark et al. | |
| 4,619,976 A | 10/1986 | Morris et al. | |
| 4,645,802 A | 2/1987 | Jackson, Jr. et al. | |
| 4,786,692 A | 11/1988 | Allen et al. | |
| 4,897,453 A | 1/1990 | Flora et al. | |
| 5,104,723 A | 4/1992 | Freitag et al. | |
| 5,132,154 A | 7/1992 | Westeppe et al. | |
| 5,207,967 A * | 5/1993 | Small et al. ............ 264/328.16 | |
| 5,411,999 A | 5/1995 | Gallucci | |
| 5,461,120 A | 10/1995 | Mason et al. | |
| 5,478,896 A | 12/1995 | Scott | |
| 5,942,585 A * | 8/1999 | Scott et al. ............... 525/439 | |
| 6,037,424 A * | 3/2000 | Scott et al. ............... 525/439 | |
| 6,043,322 A | 3/2000 | Scott et al. | |
| 6,136,441 A | 10/2000 | MacGregor et al. | |
| 6,723,768 B2 * | 4/2004 | Adams et al. ............ 524/108 | |
| 2002/0111428 A1 | 8/2002 | Gaggar et al. | |
| 2002/0115792 A1 | 8/2002 | Verhoogt et al. | |
| 2006/0074202 A1 * | 4/2006 | Juikar et al. ............... 525/439 |
| 2006/0135690 A1 * | 6/2006 | Juikar et al. ............... 525/67 |
| 2006/0205895 A1 | 9/2006 | Gaggar et al. | |

FOREIGN PATENT DOCUMENTS

| | | |
|---|---|---|
| EP | 683208 | 11/1995 |
| EP | 724172 | 7/1996 |
| EP | 1510552 A1 | 3/2005 |
| GB | 1121866 | 7/1968 |
| GB | 1264741 | 2/1972 |
| WO | 0192419 A2 | 12/2001 |

OTHER PUBLICATIONS

European Patent Office, PCT International Search Report, International Application No. PCT/US2008/070868, Date of Mailing: Nov. 5, 2008.
European Patent Office, PCT Written Opinion of ISA, International Application No. PCT/US2008/070868, Date of Mailing: Nov. 5, 2008.
Preliminary Report on Patentability: International Application No. PCT/US2008/070868; International Filing Date: Jul. 23, 2008; Priority Date Jul. 25, 2007; Applicant's File Reference 202140; Date of Mailing Feb. 4, 2010; 8 pages.

* cited by examiner

*Primary Examiner* — Mark Eashoo
*Assistant Examiner* — David Karst
(74) *Attorney, Agent, or Firm* — Cantor Colburn LLP; Diderico van Eyl

(57) ABSTRACT

A composition of matter comprising a thermoplastic resin composition derived from (i) a polyester derived from a cycloaliphatic diol, and an aromatic diacid; (ii) a polycarbonate derived from at least from 20 mole percent to 100 mole percent of an aromatic diol derived from structure II

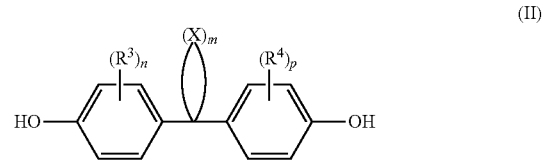

wherein $R^3$ and $R^4$ are independently selected from the group consisting of $C_1$-$C_{30}$ aliphatic, $C_2$-$C_{30}$ cycloaliphatic and $C_2$-$C_{30}$ aromatic groups, X is $CH_2$ and m is an integer from 3 to 7, n is an integer from 1 to 4, p is an integer from 1 to 4, and from 0 mole percent to 80 mole percent of a second aromatic dihydroxy compound; and wherein the resin composition is transparent is disclosed. Also disclosed is a process to prepare this composition and articles therefrom.

24 Claims, No Drawings

POLYESTER-POLYCARBONATE COMPOSITIONS

BACKGROUND

The invention relates to polyester compositions, methods to synthesize the compositions and articles made from the compositions.

Polycarbonate (PC) is a useful engineering plastic for parts requiring clarity, high toughness, and, in some cases, good heat resistance. However, polycarbonate also has some important deficiencies, among them poor chemical and stress crack resistance, poor resistance to sterilization by gamma radiation. Polycarbonates may be blended with other different, miscible or immiscible polymers, to improve various mechanical or other properties of the polycarbonate. For applications requiring improved mechanical properties, miscible blends are useful, as they also allow use of the blends for applications requiring transparency. Specifically, polyesters may be blended with polycarbonates for improved properties over those based upon either of the single resins alone. However, other properties of polycarbonates, specifically optical properties, may be adversely affected by forming a blend, where the polycarbonate can form a hazy appearance and diminished light transmittance.

The compound, 1,1-bis(4'-hydroxy-3'-methylphenyl)cyclohexane (hereinafter also referred to as DMBPC) has been used as an aromatic dihydroxy compound monomer or comonomer for preparing polycarbonates, which are generally characterized with high glass transition temperatures. For example, polycarbonate homopolymers have been prepared by an interfacial polycondensation method using phosgene and monomers such as DMBPC. Polycarbonates derived from DMBPC can be used in making optical data storage products. DMBPC is generally prepared by reacting cyclohexanone with o-cresol in the presence of a condensation catalyst. However polycarbonates derived from DMBPC, suffer from such as increased brittleness and discoloration in the polycarbonates, thereby affecting the transparency of polymer.

Transparent, miscible compositions of any two polymers are rare. The term "miscible," as used in the specification, refers to compositions that are a mixture on a molecular level wherein intimate polymer-polymer interaction is achieved. Miscible compositions are transparent, not opaque. In addition, differential scanning calorimetry testing detects only a single glass transition temperature (Tg) for miscible blends composed of two or more components. Thus miscibility of polycarbonate with the polyesters gives the blends the clarity needed.

Clear polycarbonate/polyester blends have been reported in U.S. Pat. Nos. 4,619,976; 4,188,314; 4,391,954; 4,188,314; 4,125,572; 4,391,954; 4,786,692; 4,897,453; 5,478,896; 4,125,572; 4,786,692 and 4,645,802 and GB patent 1,121,866 disclose clear blends based on bisphenol A polycarbonate with a variety of polyesters for example poly(1,4-tetramethylene terephthalate), poly(1,4-cyclohexylenedimethylene terephthalate) and selected copolyesters and copoly(esterimides) of poly(1,4-cyclohexylenedimethylene terephthalate). However, the heat resistance and impact strength of bisphenol A polycarbonate blends based on these compositions is reduced significantly relative to polycarbonate alone. The application US20020115792 discloses translucent compositions including an aromatic polycarbonate, a cycloaliphatic polyester and a polyolefin having low temperature impact strength. Blends of polyesters with polycarbonate having special cyclic bridging group is disclosed in U.S. Pat. Nos. 5,104,723; 5,132,154 and EP patent 0 683208A2 and EP 02 724172A2.

There exists an unmet need to provide an article with a good balance of optical property, improved heat resistance, processability, and mechanical properties and flame resistance.

For the foregoing reasons, there is an unmet need to develop methods for making polyester blend compositions that can provide a combination of high heat, good optical properties without loss in the mechanical properties.

For the foregoing reasons, there is an unmet need to develop articles derived from such blend compositions that can provide a combination of high heat, good optical properties without loss in the mechanical properties.

For the foregoing reasons, the industry needs to develop technologies that can provide molding compositions having useful mechanical and optical properties with polyesters having high heat resistance and good optical properties.

BRIEF DESCRIPTION OF THE INVENTION

According to one embodiment of the present invention, the invention relates to a composition of matter comprising a thermoplastic resin composition derived from (i) a polyester derived from a cycloaliphatic diol, and an aromatic diacid; (ii) a polycarbonate derived from at least from 20 mole percent to 100 mole percent of an aromatic diol derived from structure II

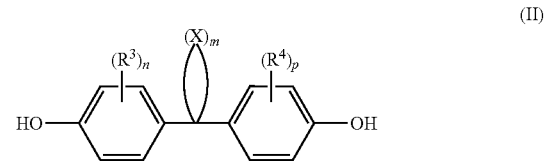

(II)

wherein $R^3$ and $R^4$ are independently selected from the group consisting of $C_1$-$C_{30}$ aliphatic, $C_2$-$C_{30}$ cycloaliphatic and $C_2$-$C_{30}$ aromatic groups, X is $CH_2$ and m is an integer from 3 to 7, n is an integer from 1 to 4, p is an integer from 1 to 4, and from 0 mole percent to 80 mole percent of an aromatic dihydroxy compound; and wherein the resin composition is transparent is disclosed.

According to one embodiment of the present invention, the invention relates to a composition of matter comprising a thermoplastic resin composition derived from (i) from 5 to 95 weight percent of a polyester derived from a cycloaliphatic diol, and an aromatic diacid; (ii) from 5 to 95 weight percent of a polycarbonate derived from at least from 20 mole percent to 100 mole percent of an aromatic diol derived from structure II

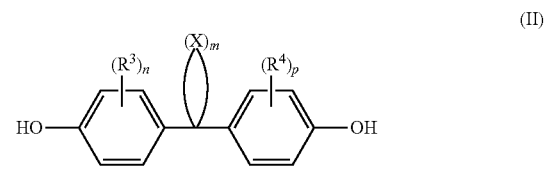

(II)

wherein $R^3$ and $R^4$ are independently selected from the group consisting of $C_1$-$C_{30}$ aliphatic, $C_2$-$C_{30}$ cycloaliphatic and $C_2$-$C_{30}$ aromatic groups, X is $CH_2$ and m is an integer from 3 to 7, n is an integer from 1 to 4, p is an integer from 1 to 4, and from 0 mole percent to 80 mole percent of an aromatic dihydroxy compound; from 0 to 70 weight percent of a thermoplastic resin C, different from the polyester and the polycarbonate polymer, that is selected from the group consisting of homopolycarbonate, a poly(estercarbonate), a poly(arylatecarbonate) and combinations thereof; and wherein the thermoplastic resin composition is transparent is disclosed.

In another embodiment, the invention relates to a process comprising: (a) mixing a polyester, a polycarbonate and optionally a thermoplastic resin C to form a first mixture; (b) heating the first mixture at a temperature sufficiently high to form a composition of matter comprising a thermoplastic resin composition derived from (i) a polyester derived from cycloaliphatic diol, and an aromatic diacid; (ii) a polycarbonate derived from at least from 20 mole percent to 100 mole percent of an aromatic diol derived from structure II

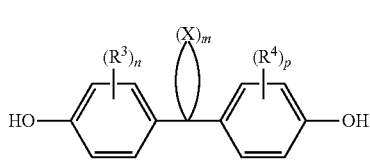

(II)

wherein $R^3$ and $R^4$ are independently selected from the group consisting of $C_1$-$C_{30}$ aliphatic, $C_2$-$C_{30}$ cycloaliphatic and $C_2$-$C_{30}$ aromatic groups, X is $CH_2$ and m is an integer from 3 to 7, n is an integer from 1 to 4, p is an integer from 1 to 4, and from 0 mole percent to 80 mole percent of an aromatic dihydroxy compound; and wherein the thermoplastic resin composition is transparent.

In another embodiment, the invention relates to an article molded from such a composition.

In another embodiment, the invention relates to a method of making an article by extruding, molding, or shaping the above-described compositions into an article.

Various other features, aspects, and advantages of the present invention will become more apparent with reference to the following description, examples, and appended claims.

DETAILED DESCRIPTION OF THE INVENTION

The invention is based on the discovery that blends of cycloaliphatic polyester and certain polycarbonates derived from structure II

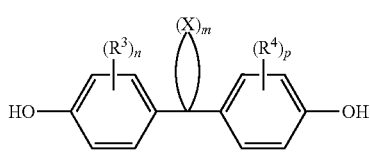

(II)

and a second aromatic dihydroxy compound, lead to compositions with good optical properties without loss in mechanical properties. In addition these compositions show good heat stability and scratch resistance. The compositions display a good balance of flow, ductility, scratch resistance while maintaining the transparency and heat properties.

The singular forms "a," "an" and "the" include plural referents unless the context clearly dictates otherwise.

"Optional" or "optionally" means that the subsequently described event or circumstance may or may not occur, and that the description includes instances where the event occurs and instances where it does not.

"Combination" as used herein includes mixtures, copolymers, reaction products, blends, composites, and the like.

Other than the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein the term "aliphatic radical" refers to a radical having a valence of at least one comprising a linear or branched array of atoms, which is not cyclic. The array may include heteroatoms such as nitrogen, sulfur, silicon, selenium and oxygen or can be composed exclusively of carbon and hydrogen. Aliphatic radicals can be "substituted" or "unsubstituted." A substituted aliphatic radical is defined as an aliphatic radical which comprises at least one substituent. A substituted aliphatic radical may comprise as many substituents as there are positions available on the aliphatic radical for substitution. Substituents which can be present on an aliphatic radical include, but are not limited to, halogen atoms such as fluorine, chlorine, bromine, and iodine. Substituted aliphatic radicals include trifluoromethyl, hexafluoroisopropylidene, chloromethyl; difluorovinylidene; trichloromethyl, bromoethyl, bromotrimethylene (e.g. —$CH_2CHBrCH_2$—), and the like. For convenience, the term "unsubstituted aliphatic radical" is defined herein to encompass, as part of the "linear or branched array of atoms which is not cyclic" comprising the unsubstituted aliphatic radical, a wide range of functional groups. Examples of unsubstituted aliphatic radicals include allyl, aminocarbonyl (i.e. —$CONH_2$), carbonyl, dicyanoisopropylidene (i.e. —$CH_2C(CN)_2CH_2$—), methyl (i.e. —$CH_3$), methylene (i.e. —$CH_2$—), ethyl, ethylene, formyl, hexyl, hexamethylene, hydroxymethyl (i.e. —$CH_2OH$), mercaptomethyl (i.e. —$CH_2SH$), methylthio (i.e. —$SCH_3$), methylthiomethyl (i.e. —$CH_2SCH_3$), methoxy, methoxycarbonyl, nitromethyl (i.e. —$CH_2NO_2$), thiocarbonyl, trimethylsilyl, t-butyldimethylsilyl, trimethyoxysilypropyl, vinyl, vinylidene, and the like. Aliphatic radicals are defined to comprise at least one carbon atom. A $C_1$-$C_{10}$ aliphatic radical includes substituted aliphatic radicals and unsubstituted aliphatic radicals containing at least one but no more than 10 carbon atoms.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or can be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. Aromatic radicals can be "substituted" or "unsubstituted." A substituted aromatic radical is defined as an aromatic radical which comprises at least one substituent.

A substituted aromatic radical may comprise as many substituents as there are positions available on the aromatic radical for substitution. Substituents which can be present on an aromatic radical include, but are not limited to, halogen atoms such as fluorine, chlorine, bromine, and iodine. Substituted aromatic radicals include trifluoromethylphenyl, hexafluoroisopropylidenebis(4-phenyloxy) (i.e. —OPhC(CF$_3$)$_2$PhO—), chloromethylphenyl; 3-trifluorovinyl-2-thienyl; 3-trichloromethylphenyl (i.e. 3-CCl$_3$Ph-), bromopropylphenyl (i.e. BrCH$_2$CH$_2$CH$_2$Ph-), and the like. For convenience, the term "unsubstituted aromatic radical" is defined herein to encompass, as part of the "array of atoms having a valence of at least one comprising at least one aromatic group," a wide range of functional groups. Examples of unsubstituted aromatic radicals include 4-allyloxyphenoxy, aminophenyl (i.e. H$_2$NPh-), aminocarbonylphenyl (i.e. NH$_2$COPh-), 4-benzoylphenyl, dicyanoisopropylidenebis(4-phenyloxy) (i.e. —OPhC(CN)$_2$PhO—), 3-methylphenyl, methylenebis(4-phenyloxy) (i.e. —OPhCH$_2$PhO—), ethylphenyl, phenylethenyl, 3-formyl-2-thienyl, 2-hexyl-5-furanyl; hexamethylene-1,6-bis(4-phenyloxy) (i.e. —OPh(CH$_2$)$_6$PhO—); 4-hydroxymethylphenyl (i.e. 4-HOCH$_2$Ph-), 4-mercaptomethylphemyl (i.e. 4-HSCH$_2$Ph-), 4-methylthiophenyl (i.e. 4-CH$_3$SPh-), methoxyphenyl, methoxycarbonylphenyloxy (e.g. methyl salicyl), nitromethylphenyl (i.e. -PhCH$_2$NO$_2$), trimethylsilylphenyl, t-butyldimethylsilylphenyl, vinylphenyl, vinylidenebis(phenyl), and the like. The term "a C$_3$-C$_{10}$ aromatic radical" includes substituted aromatic radicals and unsubstituted aromatic radicals containing at least three but no more than 10 carbon atoms. The aromatic radical 1-imidazolyl (C$_3$H$_2$N$_2$—) represents a C$_3$ aromatic radical. The benzyl radical (C$_7$H$_8$—) represents a C$_7$ aromatic radical.

As used herein, the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethy group (C$_6$H$_{11}$CH$_2$—) is an cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or can be composed exclusively of carbon and hydrogen. Cycloaliphatic radicals can be "substituted" or "unsubstituted." A substituted cycloaliphatic radical is defined as a cycloaliphatic radical which comprises at least one substituent. A substituted cycloaliphatic radical may comprise as many substituents as there are positions available on the cycloaliphatic radical for substitution. Substituents which can be present on a cycloaliphatic radical include, but are not limited to, halogen atoms such as fluorine, chlorine, bromine, and iodine. Substituted cycloaliphatic radicals include trifluoromethylcyclohexyl, hexafluoroisopropylidenebis(4-cyclohexyloxy) (i.e. —OC$_6$H$_{11}$C(CF$_3$)$_2$C$_6$H$_{11}$O—), chloromethylcyclohexyl; 3-trifluorovinyl-2-cyclopropyl; 3-trichloromethylcyclohexyl (i.e. 3-CCl$_3$C$_6$H$_{11}$—), bromopropylcyclohexyl (i.e. BrCH$_2$CH$_2$CH$_2$C$_6$H$_{11}$—), and the like. For convenience, the term "unsubstituted cycloaliphatic radical" is defined herein to encompass a wide range of functional groups. Examples of unsubstituted cycloaliphatic radicals include 4-allyloxycyclohexyl, aminocyclohexyl (i.e. H$_2$N C$_6$H$_{11}$—), aminocarbonylcyclopenyl (i.e. NH$_2$COC$_5$H$_9$—), 4-acetyloxycyclohexyl, dicyanoisopropylidenebis(4-cyclohexyloxy) (i.e. —OC$_6$H$_{11}$C(CN)$_2$C$_6$H$_{11}$O—), 3-methylcyclohexyl, methylenebis(4-cyclohexyloxy) (i.e. —OC$_6$H$_{11}$CH$_2$C$_6$H$_{11}$O—), ethylcyclobutyl, cyclopropylethenyl, 3-formyl-2-terahydrofuranyl, 2-hexyl-5-tetrahydrofuranyl; hexamethylene-1,6-bis(4-cyclohexyloxy) (i.e. —OC$_6$H$_{11}$(CH$_2$)$_6$C$_6$H$_{11}$O—); 4-hydroxymethylcyclohexyl (i.e. 4-HOCH$_2$C$_6$H$_{11}$—), 4-mercaptomethylcyclohexyl (i.e. 4-HSCH$_2$C$_6$H$_{11}$—), 4-methylthiocyclohexyl (i.e. 4-CH$_3$SC$_6$H$_{11}$—), 4-methoxycyclohexyl, 2-methoxycarbonylcyclohexyloxy (2-CH$_3$OCO C$_6$H$_{11}$O—), nitromethylcyclohexyl (i.e. NO$_2$CH$_2$C$_6$H$_{10}$—), trimethylsilylcyclohexyl, t-butyldimethylsilylcyclopentyl, 4-trimethoxysilyethylcyclohexyl (e.g. (CH$_3$O)$_3$SiCH$_2$CH$_2$C$_6$H$_{10}$—), vinylcyclohexenyl, vinylidenebis(cyclohexyl), and the like. The term "a C$_3$-C$_{10}$ cycloaliphatic radical" includes substituted cycloaliphatic radicals and unsubstituted cycloaliphatic radicals containing at least three but no more than 10 carbon atoms. The cycloaliphatic radical 2-tetrahydrofuranyl (C$_4$H$_7$O—) represents a C$_4$ cycloaliphatic radical. The cyclohexylmethyl radical (C$_6$H$_{11}$CH$_2$—) represents a C$_7$ cycloaliphatic radical.

The term "alkyl" as used in the various embodiments of the present invention is intended to designate both linear alkyl, branched alkyl, aralkyl, cycloalkyl, bicycloalkyl, tricycloalkyl and polycycloalkyl radicals containing carbon and hydrogen atoms, and optionally containing atoms in addition to carbon and hydrogen, for example atoms selected from Groups 15, 16 and 17 of the Periodic Table. The term "alkyl" also encompasses that alkyl portion of alkoxide groups. In various embodiments normal and branched alkyl radicals are those containing from 1 to about 32 carbon atoms, and include as illustrative non-limiting examples C1-C32 alkyl optionally substituted with one or more groups selected from C1-C32 alkyl, C3-C15 cycloalkyl or aryl; and C3-C15 cycloalkyl optionally substituted with one or more groups selected from C1-C32 alkyl. Some particular illustrative examples comprise methyl, ethyl, n-propyl, isopropyl, n-butyl, sec-butyl, tertiary-butyl, pentyl, neopentyl, hexyl, heptyl, octyl, nonyl, decyl, undecyl and dodecyl. Some illustrative non-limiting examples of cycloalkyl and bicycloalkyl radicals include cyclobutyl, cyclopentyl, cyclohexyl, methylcyclohexyl, cycloheptyl, bicycloheptyl and adamantyl. In various embodiments aralkyl radicals are those containing from 7 to about 14 carbon atoms; these include, but are not limited to, benzyl, phenylbutyl, phenylpropyl, and phenylethyl. In various embodiments aryl radicals used in the various embodiments of the present invention are those substituted or unsubstituted aryl radicals containing from 6 to 18 ring carbon atoms. Some illustrative non-limiting examples of these aryl radicals include C6-C15 aryl optionally substituted with one or more groups selected from C1-C32 alkyl, C3-C15 cycloalkyl or aryl. Some particular illustrative examples of aryl radicals comprise substituted or unsubstituted phenyl, biphenyl, toluyl and naphthyl.

According to one embodiment of the present invention, a composition of matter comprising a thermoplastic resin composition derived from (i) a polyester derived from a cycloaliphatic diol, and an aromatic diacid; (ii) a polycarbonate derived from at least from 20 mole percent to 100 mole percent of an aromatic diol derived from structure II

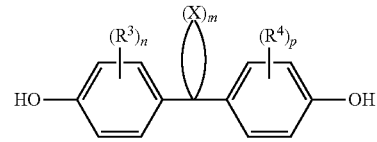

(II)

wherein R$^3$ and R$^2$ are independently selected from the group consisting of C$_1$-C$_{30}$ aliphatic, C$_2$-C$_{30}$ cycloaliphatic and C$_2$-C$_{30}$ aromatic groups, X is CH$_2$ and m is an integer from 3 to 7, n is an integer from 1 to 4, p is an integer from 1 to 4, and from 0 mole percent to 80 mole percent of an aromatic dihydroxy compound; and wherein the resin composition is transparent is disclosed.

In one embodiment of the present invention, the polyester is a cycloaliphatic polyester comprising repeating units of the structure (I)

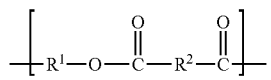
(I)

where $R^1$ is a cycloalkyl containing radical. In one embodiment, the polyester is derived from a cycloaliphatic diol and an aromatic diacid containing from 2 to about 30 carbon atoms. In one embodiment of the present invention, the polyesters are derived from cyclohexane dimenthanol. In one embodiment, the diol is a 1,4-cyclohexane dimenthanol and particularly its cis- and trans-isomers. In another embodiment, the cyclohexane dimenthanol is at least about 10 mole percent of the total diol mixture present in the polyester. In another embodiment, the cycloaliphatic diol is present in an amount ranging from 10 to 100 mole percent of the total diol mixture present in the polyester.

In one embodiment, the polyester comprises an additional diol. Some of the additional diols useful in the preparation of the polyester resins of the present invention are straight chain, branched, containing from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; triethylene glycol; 1,10-decane diol; and mixtures of any of the foregoing. In one embodiment, the diol include glycols, such as ethylene glycol, propylene glycol, butanediol, hydroquinone, resorcinol, trimethylene glycol, 2-methyl-1,3-propane glycol, 1,4-butanediol, hexamethylene glycol, decamethylene glycol, or neopentylene glycol. Examples of the polyvalent alcohol include, but are not limited to, an aliphatic polyvalent alcohol, an alicyclic polyvalent alcohol, and an aromatic polyvalent alcohol, including ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, polytetramethylene glycol, trimethylolethane, trimethylolpropane, glycerin, pentaerythritol, spiroglycol, tricyclodecanediol, tricyclodecanedimethanol, m-xylene glycol, o-xylene glycol, p-xylene glycol 1,4-phenylene glycol, bisphenol A, lactone polyester and polyols. In one embodiment, the additional diol can be a polyhydric alcohol. The additional diol is present in an amount ranging from about 0 to about 85 mole percent. In another embodiment, the polyester is further derived from an additional diol selected from the group consisting of ethylene glycol, propylene glycol, butanediol, pentane diol; dipropylene glycol; 2-methyl-1,5-pentane diol; 1,6-hexane diol; dimethanol decalin, dimethanol bicyclo octane; triethylene glycol; 1,10-decane diol; tricyclodecane dimethanol; hydrogenated bisphenol-A, tetramethyl cyclobutane diol and combinations thereof. In one embodiment, the additional diol is present in an amount from 0 to about 75 mole percent, based on the total amount of diol.

In one embodiment of the present invention, the diacid is an aromatic diacid. Chemical equivalents of these diacids include esters, alkyl esters, e.g., dialkyl esters, diaryl esters, anhydrides, salts, acid chlorides, acid bromides, and the like. Examples of aromatic dicarboxylic acids from which the decarboxylated residue $R^2$ may be derived are acids that contain a single aromatic ring per molecule such as, e.g., isophthalic or terephthalic acid, 1,2-di(p-carboxyphenyl)ethane, 4,4'-dicarboxydiphenyl ether, 4,4'-bisbenzoic acid and mixtures thereof, as well as acids contain fused rings such as, e.g. 1,4-, 1,5-, or 2,6-naphthalene dicarboxylic acids. In one embodiment, the additional acids can be a polyvalent carboxylic acid that include, but are not limited to, an aromatic polyvalent carboxylic acid, an aromatic oxycarboxylic acid, an aliphatic dicarboxylic acid, and an alicyclic dicarboxylic acid, including terephthalic acid, isophthalic acid, ortho-phthalic acid, 1,5-naphthalenedicarboxylic acid, 2,6-naphthalenedicarboxylic acid, stilbenedicarboxylic acid, diphenic acid, sulfoterephthalic acid, 5-sulfoisophthalic acid, 4-sulfophthalic acid, 4-sulfonaphthalene 2,7-dicarboxylic acid, 5-[4-sulfophenoxy]isophthalic acid, sulfoterephthalic acid, p-oxybenzoic acid, p-(hydroxyethoxy)benzoic acid, hexahydrophthalic acid, tetrahydrophthalic acid and combinations thereof. These may be used in the form of metal salts and ammonium salts and the like.

In one embodiment, $R^1$ is a cycloaliphatic radicals selected from the following formula:

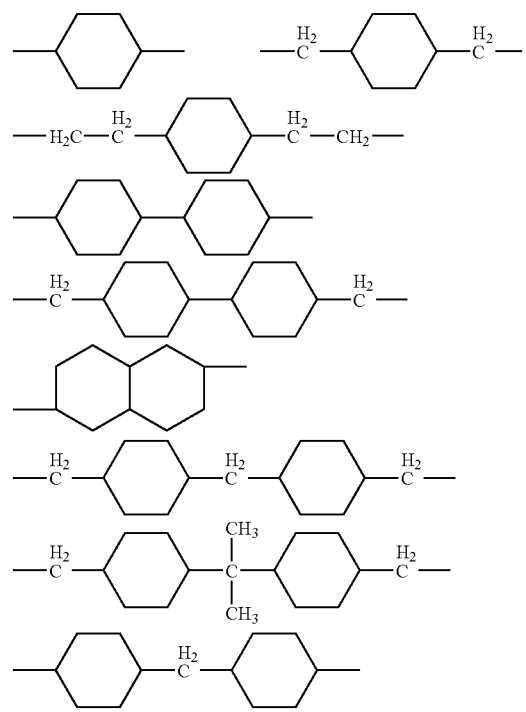

In one embodiment, the additional diol selected from the group consisting of ethylene glycol, propylene glycol, butane diol and mixtures thereof, and the aromatic diacid selected from the group consisting of terephthalic acid, isophthalic acid and stilbene dicarboxylic acid. In one embodiment, the polyester is derived from cyclohexane dimethanol and ethylene glycol. In another embodiment, the cyclohexane dimethanol is present in an amount ranging from more than 0 and less than 50 mole percent based on the total amount of diol. In yet another embodiment, the cyclohexane dimethanol is present in an amount ranging from at least 50 mole percent based on the total amount of diol.

In one embodiment, the polyester is at least one selected from Poly(1,4-cyclohexanedimethylene terephthalate) (also hereinafter known as "PCT"); Poly(70 mol % ethylene terephthalate)-co-(30 mol % 1,4-cyclohexanedimethylene terephthalate) (also hereinafter known as "PETG"); Poly(20 mol % ethylene terephthalate)-co-(80 mol % 1,4-cyclohexanedimethylene terephthalate) (also hereinafter known as "PCTG").

In one embodiment, the polymer includes a small amount of, e.g., up to 5 mole percent based on the acid units of a branching component containing at least three ester forming groups. The branching component can be one that provides branching in the acid unit portion of the polyester, in the glycol unit portion, or it can be a hybrid branching agent that includes both acid and alcohol functionality. Illustrative of such branching components are tricarboxylic acids, such as trimesic acid, and lower alkyl esters thereof, and the like; tetracarboxylic acids, such as pyromellitic acid, and lower alkyl esters thereof, and the like; or preferably, polyols, and especially preferably, tetrols, such as pentaerythritol; triols, such as trimethylolpropane; dihydroxy carboxylic acids; trimethyl trimesate, and hydroxydicarboxylic acids and derivatives, such as dimethyl hydroxyterephthalate, and the like.

Typically the polyester can have a number average molecular weight of about 5,000 atomic mass units (AMU) to about 200,000 AMU, as measured by gel permeation chromatography using polystyrene standards. Within this range, a number average molecular weight of at least about 8000 AMU is preferred. Also within this range, a number average molecular weight of up to about 100,000 AMU is preferred, and a number average molecular weight of up to about 50,000 AMU is more preferred.) It is contemplated that the polyesters have various known end groups. The preferred polyesters preferably have an intrinsic viscosity (as measured in 60:40 solvent mixture of phenol/tetrachloroethane at 25° C.) ranging from about 0.05 to about 1.5 deciliters per gram.

The polyester can be present in the composition from about 1 to about 99 weight percent, based on the total weight of the composition. In another embodiment, the polyester can be present in the composition from about 5 to about 95 weight percent based on the total weight of the composition. In another embodiment, the polyester can be present in the composition from about 10 to about 70 weight percent based on the total weight of the composition. In yet another embodiment, the polyester can be present in an amount ranging from 5 to 25 weight percent based on the total weight of the composition.

In one embodiment of the present invention, the polycarbonate is derived from at least from 20 mole percent to 100 mole percent of an aromatic diol derived from structure II

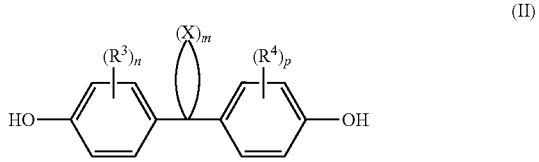

(II)

wherein $R^3$ and $R^4$ are independently selected from the group consisting of C1-C30 aliphatic, $C_2$-$C_{30}$ cycloaliphatic and $C_2$-$C_{30}$ aromatic groups, X is $CH_2$ and m is an integer from 3 to 7, n is an integer from 1 to 4, p is an integer from 1 to 4. Representative units of structure (II) include, but are not limited to, residues of 1,1-bis(4-hydroxy-3-methylphenyl) cyclohexane (DMBPC); 1,1-bis(4-hydroxyphenyl)cyclohexane; 1,1-bis(3,5-dimethylphenyl-4-hydroxyphenyl)cyclohexane; 1,1-bis(3,5-dimethylphenyl-4-hydroxyphenyl) cyclopentane; 1,1-bis(4-hydroxy-3-methylphenyl) cyclopentane; 1,1-bis(4-hydroxy-3-methylphenyl) cycloheptane; 1,1-bis(4-hydroxy-3-methylphenyl)-3,3,5-trimethylcyclohexane (DMBPI); and fluorenylidene-9-bis(3-methyl-4-hydroxybenzene) (DMBPF) and mixtures thereof. In one embodiment, the structure (II) is selected from the group consisting of 1,1-bis(4-hydroxy-3-methylphenyl)cyclohexane and fluorenylidene-9-bis(3-methyl-4-hydroxybenzene).

In one embodiment of the present invention, the polycarbonate comprises from about 20 to about 100 mole % of aromatic diol derived from structure (II). In another embodiment, the polycarbonate comprises from about 25 to about 80 mole % of aromatic diol derived from structure (II). DMBPC may be easily synthesized from cyclohexanone and ortho-cresol.

In one embodiment, the DMBPC comprises less than about 250 parts of any combination of 1-(4'-hydroxy-3'-methylphenyl)-1-(4'-hydroxy-3',5'-dimethylphenyl)cyclohexane compound and 1,1-bis(4'-hydroxy-3',5'-dimethylphenyl) cyclohexane compound (hereinafter collectively abbreviated as "TMBPC") as an impurity, per million parts of the second-crystalline product, with less than about 100 parts even more preferred. Furthermore, in another embodiment, the DMBPC preferably comprises less than about 3000 parts of a 1-(4'-hydroxy-3'-methylphenyl)-1-(2'-hydroxy-3'-methylphenyl) cyclohexane compound as an impurity per million parts of the second-crystalline product, with less than about 100 parts even more preferred. The presence of these impurities in DMBPC can be minimized in order to prepare high molecular weight polycarbonate copolymers.

In one embodiment, the polycarbonates comprising structural units derived from structure (II) can be prepared by methods including melt polymerization, interfacial polymerization, solid state polymerization, thin-film melt polymerization, and the like. In another embodiment, interfacial polymerization can also be carried out by using a bischloroformate derivative of the purified DMBPC.

In one embodiment, the polycarbonate comprises a second dihydroxy aromatic compound of the formula HO-D-OH, wherein D has the structure of formula:

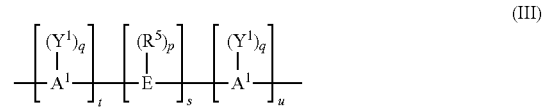

(III)

wherein $A^1$ represents an aromatic group including, but not limited to, phenylene, biphenylene, naphthylene, and the like. In some embodiments E may be an alkylene or alkylidene group including, but not limited to, methylene, ethylene, ethylidene, propylene, propylidene, isopropylidene, butylene, butylidene, isobutylidene, amylene, amylidene, isoamylidene, and the like. In other embodiments when E is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, and the like; or a phosphorus-containing linkage including, but not limited to, phosphinyl, phosphonyl, and the like. In other embodiments E can be a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^5$ independently at each occurrence comprises a monovalent hydrocarbon group including, but not limited to, alkenyl, allyl, alkyl, aryl, aralkyl, alkaryl, or cycloalkyl. In various embodiments a monovalent hydrocarbon group of $R^5$ may be halogen-substituted, particularly fluoro- or chloro-substituted, for example as in dichloroalkylidene, particularly gem-dichloroalkylidene. $Y^1$ independently at each occurrence may be an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^6$ wherein $R^6$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$-$C_6$ alkyl group. The letter "q" represents any integer from and including zero through the number of replaceable hydrogens on $A^1$ available for substitution; "p" represents an integer from and including zero through the number of replaceable hydrogens on E available for substitution; "t" represents an integer equal to at least one; "s" represents an integer equal to either zero or one; and "u" represents any integer including zero.

In the second dihydroxy aromatic compound in which D is represented by formula (III) above, when more than one $Y^1$ substituent is present, they may be the same or different. The same holds true for the $R^5$ substituent. Where "s" is zero in formula (III) and "u" is not zero, the aromatic rings are directly joined by a covalent bond with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene. In one embodiment, the second dihydroxy aromatic compound is not derived from structure (III).

In some embodiments, the second dihydroxy aromatic compound E may be an unsaturated alkylidene group. Suitable second dihydroxy aromatic compound of this type include those of the formula (IV):

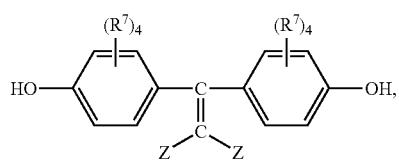

(IV)

where independently each $R^7$ is hydrogen, chlorine, bromine or a $C_{1-30}$ monovalent hydrocarbon or hydrocarbonoxy group, each Z is hydrogen, chlorine or bromine, subject to the provision that at least one Z is chlorine or bromine.

Suitable second dihydroxy aromatic compound also include those of the formula (V):

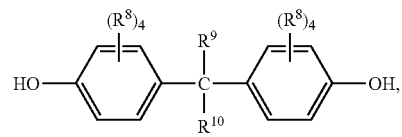

(V)

where independently each $R^8$ is as defined hereinbefore, and independently $R^9$ and $R^{10}$ are hydrogen or a C1-30 hydrocarbon group.

In other embodiments of the invention, the second dihydroxy aromatic compound comprise bis(4-hydroxyphenyl) sulfide, bis(4-hydroxyphenyl) ether, bis(4-hydroxyphenyl) sulfone, bis(4-hydroxyphenyl)sulfoxide, 1,4-dihydroxybenzene, 4,4'-oxydiphenol, 2,2-bis(4-hydroxyphenyl)hexafluoropropane, 4,4'-(3,3,5-trimethylcyclohexylidene)diphenol; 4,4'-bis(3,5-dimethyl) diphenol, 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,2-bis(4-hydroxyphenyl)ethane; 1,1-bis(4-hydroxy-2-chlorophenyl) ethane; 2,2-bis(3-phenyl-4-hydroxyphenyl)propane; 2,2-bis (4-hydroxy-3-methylphenyl)propane; 2,2-bis(4-hydroxy-3-ethylphenyl)propane; 2,2-bis(4-hydroxy-3-isopropylphenyl) propane; 2,2-bis(4-hydroxy-3,5-dimethylphenyl)propane; 3,5,3',5'-tetrachloro-4,4'-dihydroxyphenyl)propane; 2,2-bis (4-hydroxyphenyl)-1-phenylpropane; 2,4'-dihydroxyphenyl sulfone; dihydroxy naphthalene; 2,6-dihydroxy naphthalene; hydroquinone; resorcinol; C1-3 alkyl-substituted resorcinols; methyl resorcinol, catechol, 1,4-dihydroxy-3-methylbenzene; 2,2-bis(4-hydroxyphenyl)butane; 2,2-bis(4-hydroxyphenyl)-2-methylbutane; 4,4'-dihydroxydiphenyl; 2-(3-methyl-4-hydroxyphenyl-2-(4-hydroxyphenyl)propane; 2-(3,5-dimethyl-4-hydroxyphenyl)-2-(4-hydroxyphenyl)propane; 2-(3-methyl-4-hydroxyphenyl)-2-(3,5-dimethyl-4-hydroxyphenyl)propane; bis(3,5-dimethylphenyl-4-hydroxyphenyl)methane; 1,1-bis(3,5-dimethylphenyl-4-hydroxyphenyl)ethane; 2,2-bis(3,5-dimethylphenyl-4-hydroxyphenyl)propane; 2,4-bis(3,5-dimethylphenyl-4-hydroxyphenyl)-2-methylbutane; 3,3-bis(3,5-dimethylphenyl-4-hydroxyphenyl)pentane; bis(3,5-dimethyl-4-hydroxyphenyl)sulfoxide, bis(3,5-dimethyl-4-hydroxyphenyl)sulfone and bis(3,5-dimethylphenyl-4-hydroxyphenyl)sulfide. In a particular embodiment the second dihydroxy aromatic compound comprises bisphenol A.

In another embodiment, the second dihydroxy aromatic compound when E is an alkylene or alkylidene group, said group may be part of one or more fused rings attached to one or more aromatic groups bearing one hydroxy substituent. Suitable second dihydroxy aromatic compound of this type include those containing indane structural units such as represented by the formula (VI), which compound is 3-(4-hydroxyphenyl)-1,1,3-trimethylindan-5-ol, and by the formula (VII), which compound is 1-(4-hydroxyphenyl)-1,3,3-trimethylindan-5-ol:

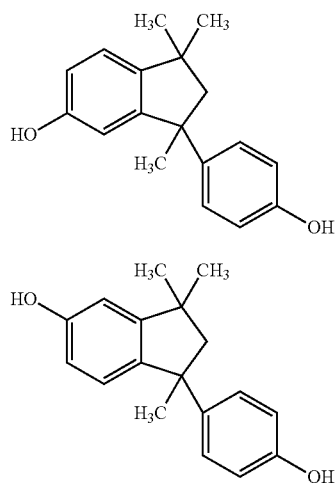

Also included among suitable second dihydroxy aromatic compounds of the type comprising one or more alkylene or alkylidene groups as part of fused rings are the 2,2,2',2'-tetrahydro-1,1'-spirobi[1H-indene]diols having formula (VIII):

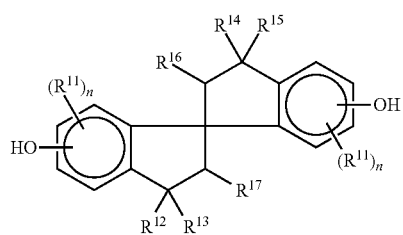

wherein each $R^{11}$ is independently selected from monovalent hydrocarbon radicals and halogen radicals; each $R^{12}$, $R^{13}$, $R^{14}$, and $R^{15}$ is independently C1-6 alkyl; each $R^{16}$ and $R^{17}$ is independently H or C1-6 alkyl; and each n is independently selected from positive integers having a value of from 0 to 3 inclusive. In a particular embodiment, the 2,2,2',2'-tetrahydro-1,1'-spirobi[1H-indene]diol is 2,2,2',2'-tetrahydro-3,3,3', 3'-tetramethyl-1,1'-spirobi[1H-indene]-6,6'-diol (sometimes known as "SBI"). Mixtures of alkali metal salts derived from mixtures of any of the foregoing second dihydroxy aromatic compound can also be employed.

Mixtures comprising two or more second dihydroxy aromatic compounds may also be employed. The polycarbonate may be prepared in the melt, in solution, or by interfacial polymerization techniques well known in the art. In one embodiment, the second dihyrdoxy aromatic compound is present in an amount from at least 0 mole percent to about 80 mole percent.

In one embodiment, the polycarbonates have an intrinsic viscosity (as measured in methylene chloride at 25° C.) ranging from about 0.30 to about 1.00 deciliters per gram. The polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups.

In one embodiment, the polycarbonate is present in an amount from about 1 to about 99 weight percent based on the total weight of the composition. In another embodiment, the polycarbonate is present in an amount from about 5 to about 95 weight percent based on the total weight of the composition. In another embodiment, the polycarbonate is present in an amount from about 10 to about 90 weight percent based on the total weight of the composition and from about 10 to about 70 weight percent based on the total weight of the composition.

In one embodiment, the thermoplastic resin C is a polycarbonate, in another embodiment the thermoplastic resin C, is an aromatic polycarbonate. The aromatic polycarbonate suitable for use in the present invention, methods of making polycarbonate resins and the use of polycarbonate resins in thermoplastic molding compounds are well known in the art, see, generally, U.S. Pat. Nos. 3,169,121, 4,487,896 and 5,411, 999, the respective disclosures of which are each incorporated herein by reference. In one embodiment, the thermoplastic resin C is derived from the second aromatic dihydroxy compound.

Polycarbonates useful in the invention comprise repeating units of the formula (IX)

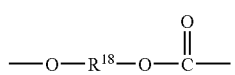

wherein $R^{18}$ is a divalent aromatic radical derived from a dihydroxyaromatic compound of the formula HO-D-OH, wherein D has the structure of formula:

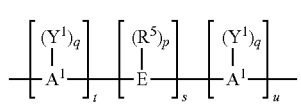

wherein $A^1$ represents an aromatic group including, but not limited to, phenylene, biphenylene, naphthylene, and the like. In some embodiments E may be an alkylene or alkylidene group including, but not limited to, methylene, ethylene, ethylidene, propylene, propylidene, isopropylidene, butylene, butylidene, isobutylidene, amylene, amylidene, isoamylidene, and the like. In other embodiments when E is an alkylene or alkylidene group, it may also consist of two or more alkylene or alkylidene groups connected by a moiety different from alkylene or alkylidene, including, but not limited to, an aromatic linkage; a tertiary nitrogen linkage; an ether linkage; a carbonyl linkage; a silicon-containing linkage, silane, siloxy; or a sulfur-containing linkage including, but not limited to, sulfide, sulfoxide, sulfone, and the like; or a phosphorus-containing linkage including, but not limited to, phosphinyl, phosphonyl, and the like. In other embodiments E may be a cycloaliphatic group including, but not limited to, cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, and the like; a sulfur-containing linkage, including, but not limited to, sulfide, sulfoxide or sulfone; a phosphorus-containing linkage, including, but not limited to, phosphinyl or phosphonyl; an ether linkage; a carbonyl group; a tertiary nitrogen group; or a silicon-containing linkage including, but not limited to, silane or siloxy. $R^5$ independently at each occurrence comprises a monovalent hydrocarbon group including, but not limited to, alkenyl, allyl, alkyl, aryl, aralkyl, alkaryl, or cycloalkyl. In various embodiments a monovalent hydrocarbon group of $R^5$ may be halogen-substituted, particularly fluoro- or chloro-substituted, for example as in dichloroalkylidene, particularly gem-dichloroalkylidene. $Y^1$ independently at each occurrence may be an inorganic atom including, but not limited to, halogen (fluorine, bromine, chlorine, iodine); an inorganic group containing more than one inorganic atom including, but not limited to, nitro; an organic group including, but not limited to, a monovalent hydrocarbon group including, but not limited to, alkenyl, allyl, alkyl, aryl, aralkyl, alkaryl, or cycloalkyl, or an oxy group including, but not limited to, $OR^6$ wherein $R^6$ is a monovalent hydrocarbon group including, but not limited to, alkyl, aryl, aralkyl, alkaryl, or cycloalkyl; it being only necessary that $Y^1$ be inert to and unaffected by the reactants and reaction conditions used to prepare the polymer. In some particular embodiments $Y^1$ comprises a halo group or $C_1$-$C_6$ alkyl group. The letter "q" represents any integer from and including zero through the number of replaceable hydrogens on $A^1$ available for substitution; "p" represents an integer from and including zero through the number of replaceable hydrogens on E available for substitution; "t" represents an integer equal to at least one; "s" represents an integer equal to either zero or one; and "u" represents any integer including zero.

In dihydroxy-substituted aromatic hydrocarbons in which D is represented by formula (III) above, when more than one $Y^1$ substituent is present, they may be the same or different. The same holds true for the $R^5$ substituent. Where "s" is zero in formula (III) and "u" is not zero, the aromatic rings are directly joined by a covalent bond with no intervening alkylidene or other bridge. The positions of the hydroxyl groups and $Y^1$ on the aromatic nuclear residues $A^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments the parameters "t", "s", and "u" each have the value of one; both $A^1$ radicals are unsubstituted phenylene radicals; and E is an alkylidene group such as isopropylidene. In some particular embodiments both $A^1$ radicals are p-phenylene, although both may be o- or m-phenylene or one o- or m-phenylene and the other p-phenylene. In one embodiment, the thermoplastic C comprises structural units derived from the second dihydroxy aromatic compound.

In another embodiment, mixtures comprising two or more hydroxy-substituted hydrocarbons may also be employed. In some particular embodiments mixtures of at least two monohydroxy-substituted alkyl hydrocarbons, or mixtures of at least one monohydroxy-substituted alkyl hydrocarbon and at least one dihydroxy-substituted alkyl hydrocarbon, or mixtures of at least two dihydroxy-substituted alkyl hydrocarbons, or mixtures of at least two monohydroxy-substituted aromatic hydrocarbons, or mixtures of at least two dihydroxy-substituted aromatic hydrocarbons, or mixtures of at least one monohydroxy-substituted aromatic hydrocarbon and at least one dihydroxy-substituted aromatic hydrocarbon, or mixtures of at least one monohydroxy-substituted alkyl hydrocarbon and at least one dihydroxy-substituted aromatic hydrocarbon may be employed. In one embodiment, the thermoplastic resin C is a blend of two or more polycarbonate resins.

The polycarbonate may be prepared in the melt, in solution, or by interfacial polymerization techniques well known in the art. For example, the aromatic polycarbonates can be made by reacting bisphenol-A with phosgene, dibutyl carbonate or diphenyl carbonate. Such aromatic polycarbonates are also commercially available. In one embodiment, the aromatic polycarbonate resins are commercially available from General Electric Company, e.g., LEXAN™ bisphenol A-type polycarbonate resins.

The preferred polycarbonates are preferably high molecular weight aromatic carbonate polymers have an intrinsic viscosity (as measured in methylene chloride at 25° C.) ranging from about 0.30 to about 1.00 deciliters per gram. Polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups. In one embodiment, the polycarbonate is present in an amount from about 0 to about 60 weight percent based on the total weight of the blend.

In one embodiment, the thermoplastic resin C, a poly(arylatecarbonate). In another embodiment the thermoplastic resin C, is a poly(estercarbonate). The poly(estercarbonate) can also be known as polyester-polycarbonate, copolyester-polycarbonate, and copolyestercarbonate. Such copolymers further contain, in addition to recurring carbonate chain units of the formula (X),

(X)

in which at least 60 percent of the total number of $R^{19}$ groups are aromatic organic radicals and the balance thereof are aliphatic, alicyclic, or aromatic radicals. In one embodiment, each $R^{19}$ is an aromatic organic radical; repeating units of formula (XI):

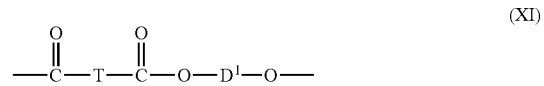

(XI)

wherein $D^1$ is a divalent radical derived from a dihydroxy compound, and may be, for example, a $C_{2-10}$ alkylene radical, a $C_{6-30}$ alicyclic radical, a $C_{6-30}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-30}$ alicyclic radical, a $C_{6-30}$ alkyl aromatic radical, or a $C_{6-30}$ aromatic radical. In another embodiment, each $R^{19}$ in formula X, is a radical of the formula (XII):

(XII)

wherein each of $A^2$ and $A^3$ is a monocyclic divalent aryl radical and $Y^2$ is a bridging radical having one or two atoms that separate $A^2$ from $A^3$. In an exemplary embodiment, one atom separates $A^2$ from $A^3$. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^2$ may be a hydrocarbon group or a saturated hydrocarbon group such as methylene, cyclohexylidene, or isopropylidene. In another embodiment, $Y^2$ is a carbon-carbon bond (—) connecting $A^2$ and $A^3$.

In one embodiment, $D^1$ is a $C_{2-6}$ alkylene radical. In another embodiment, $D^1$ is derived from an aromatic dihydroxy compound of formula (XIII).

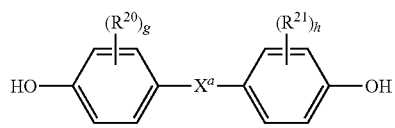
(XIII)

wherein $R^{20}$ and $R^{21}$ each represent a halogen atom or a monovalent hydrocarbon group and may be the same or different; g and h are each independently integers of 0 to 4; and $X^a$ represents one of the groups of formula (XIV):

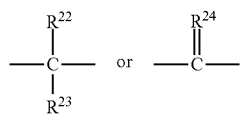
(XIV)

wherein $R^{22}$ and $R^{23}$ each independently represent a hydrogen atom or a monovalent linear alkyl or cyclic alkylene group and $R^{24}$ is a divalent hydrocarbon group. In an embodiment, $R^{22}$ and $R^{23}$ represent a cyclic alkylene group; or heteroatom-containing cyclic alkylene group comprising carbon atoms, heteroatoms with a valency of two or greater, or a combination comprising at least one heteroatom and at least two carbon atoms. Suitable heteroatoms for use in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylene group or heteroatom-containing cyclic alkylene group may have 3 to 20 atoms, and may be a single saturated or unsaturated ring, or fused polycyclic ring system wherein the fused rings are saturated, unsaturated, or aromatic.

In another embodiment, $D^1$ is derived from an aromatic dihydroxy compound of formula (XV)

(XV)

$R^{25}$ is independently a halogen atom, a $C_{1-12}$ hydrocarbon group, or a $C_{1-12}$ halogen substituted hydrocarbon group, and b is 0 to 4. The halogen is usually bromine. Examples of compounds that may be represented by the formula (XV) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acids that may be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalene-dicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of isophthalic acid to terephthalic acid is 91:1 to 2:98. In another specific embodiment, $(D^1)$ is a $C_{2-6}$ alkylene radical and T is p-phenylene, m-phenylene, naphthalene, a divalent cycloaliphatic radical, or a mixture thereof.

In an embodiment, the polyarylates comprise resorcinol arylate polyesters as illustrated in formula (XVI):

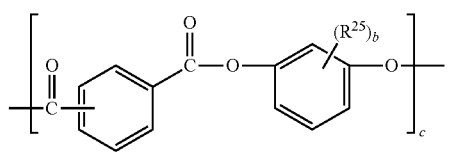
(XVI)

wherein $R^{25}$ and b are previously defined for formula (XV), and c is greater than or equal to 1. Where b is 0, $R^{25}$ is hydrogen. In an embodiment, c is 2 to 500. In another embodiment, the molar ratio of isophthalate to terephthalate can be about 0.25:1 to about 4.0:1.

In an embodiment, useful aromatic polyester blocks may include, for example, poly(isophthalate-terephthalate-resorcinol) esters, poly(isophthalate-terephthalate-bisphenol-A) esters, poly[(isophthalate-terephthalate-resorcinol) ester-co-(isophthalate-terephthalate-bisphenol-A)] ester, or a combination comprising at least one of these. Also contemplated are aromatic polyesters with a minor amount, e.g., from about 0.5 to about 10 percent by weight, of units derived from an aliphatic diacid and/or an aliphatic polyol to make co-polyesters.

In addition to the ester units, the polyester-polycarbonates comprise carbonate units as described above. In an embodiment, carbonate units may be derived from aromatic dihydroxy compounds or a combination comprising at least one of the foregoing dihydroxy compounds. In an embodiment, specific carbonate units are derived from bisphenol A carbonate and/or resorcinol carbonate units.

Thus, in an embodiment, the polyester-polycarbonates have the structure shown in formula (XVII):

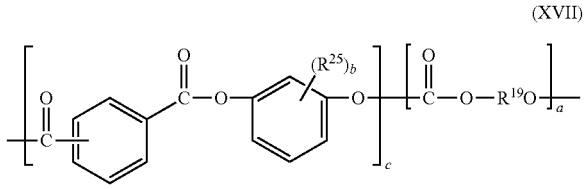
(XVII)

wherein $R^{25}$, b, and c are as defined in formula (XVI), each $R^{19}$ is independently a $C_{6-30}$ arylene group, and a is greater than or equal to one. In an embodiment, c is 2 to 500, and a is 2 to 500. In a specific embodiment, c is 3 to 300, and c is 3 to 300.

Specifically, the polyester unit of a polyester-polycarbonate can be derived from the reaction of a combination of isophthalic and terephthalic diacids (or derivatives thereof) with resorcinol, bisphenol A, or a combination comprising at least one of these, wherein the molar ratio of isophthalate units to terephthalate units is 91:9 to 2:98, specifically 85:15 to 3:97, more specifically 80:20 to 5:95, and still more specifically 70:30 to 10:90. The polycarbonate units can be derived from resorcinol and/or bisphenol A, in a molar ratio of resorcinol carbonate units to bisphenol A carbonate units of 0:100 to 99:1. In an embodiment, the polyester-polycarbonate polymer comprises isophthalate-terephthalate-resorcinol (ITR) ester units. As used herein, isophthalate-terephthalate-resorcinol ester units comprise a combination isophthalate esters, terephthalate esters, and resorcinol esters. In a specific embodiment, isophthalate-terephthalate-resorcinol ester units comprise a combination of isophthalate-resorcinol ester units and terephthalate-resorcinol ester units. The ratio of ITR ester units to the carbonate units in the polyester-polycarbonate is 1:99 to 99:1, specifically 5:95 to 95:5, more specifically 10:90 to 90:10, still more specifically 20:80 to 80:20. In a specific embodiment, the polyester-polycarbonate is a poly(isophthalate-terephthalate-resorcinol ester)-co-(bisphenol-A carbonate) polymer.

While it is contemplated that other resins may be used in the thermoplastic compositions described herein, the polyester-polycarbonate polymers having ITR ester units and carbonate units are particularly suited for use in thermoplastic compositions herein. Thus, in another embodiment, copolymers of polyester-polycarbonate consist of isophthalate-terephthalate-resorcinol ester units and carbonate units.

The polyester-polycarbonates may have a weight-averaged molecular weight (Mw) of 1,500 to 100,000, specifically 1,700 to 50,000, and more specifically 2,000 to 40,000. Molecular weight determinations are performed using gel permeation chromatography (GPC), using a crosslinked styrene-divinylbenzene column and calibrated to BPA-polycarbonate references. Samples are prepared at a concentration of about 1 mg/ml, and are eluted at a flow rate of about 1.0 ml/min.

In one embodiment, the composition of the present invention can comprise about 0 weight percent to about 80 weight percent of a thermoplastic resin C. In another embodiment, the thermoplastic resin C is present in an amount ranging from more than 30 to 80 weight percent, based on the total weight of the composition. In another embodiment, the thermoplastic resin C is present in an amount ranging from more than 0 to 25 weight percent, based on the total weight of the composition. The thermoplastic resin C is different from the polyester and the polycarbonate polymer, that is selected from the group consisting of homopolycarbonate, a poly(estercarbonate), a poly(arylatecarbonate) and combinations thereof.

In one embodiment, the composition of the present further include additives which do not interfere with the previously mentioned desirable properties but enhance other favorable properties such as anti-oxidants, flame retardants, flow modifiers, colorants, mold release agents, quenchers, UV light stabilizers, impact modifiers, heat stabilizers, reinforcing materials, colorants, nucleating agents, lubricants, antidrip agents and combinations thereof. Additionally, additives such as antioxidants, minerals such as talc, clay, mica, and other stabilizers including but not limited to UV stabilizers, such as benzotriazole, supplemental reinforcing fillers such as flaked or milled glass, and the like, flame retardants, pigments or combinations thereof may be added to the compositions of the present invention. The additive is present ranging from about 0 to 70 weight percent, based on the total weight of the thermoplastic resin.

In yet another embodiment of the present invention the composition further comprises a filler. The fillers may be of natural or synthetic, mineral or non-mineral origin, provided that the fillers have sufficient thermal resistance to maintain their solid physical structure at least at the processing temperature of the composition with which it is combined. Suitable fillers include clays, nanoclays, carbon black, wood flour either with or without oil, various forms of silica (precipitated or hydrated, fumed or pyrogenic, vitreous, fused or colloidal, including common sand), glass, metals, inorganic oxides (such as oxides of the metals in Periods 2, 3, 4, 5 and 6 of Groups Ib, IIb, IIIa, IIIb, IVa, IVb (except carbon), Va, VIa, VIa and VIII of the Periodic Table), oxides of metals (such as aluminum oxide, titanium oxide, zirconium oxide, titanium dioxide, nanoscale titanium oxide, aluminum trihydrate, vanadium oxide, and magnesium oxide), hydroxides of aluminum or ammonium or magnesium, carbonates of alkali and alkaline earth metals (such as calcium carbonate, barium carbonate, and magnesium carbonate), antimony trioxide, calcium silicate, diatomaceous earth, fuller earth, kieselguhr, mica, talc, slate flour, volcanic ash, cotton flock, asbestos, kaolin, alkali and alkaline earth metal sulfates (such as sulfates of barium and calcium sulfate), titanium, zeolites, wollastonite, titanium boride, zinc borate, tungsten carbide, ferrites, molybdenum disulfide, asbestos, cristobalite, aluminosilicates including Vermiculite, Bentonite, montmorillonite, Na-montmorillonite, Ca-montmorillonite, hydrated sodium calcium aluminum magnesium silicate hydroxide, pyrophyllite, magnesium aluminum silicates, lithium aluminum silicates, zirconium silicates, and combinations comprising at least one of the foregoing fillers. Suitable fibrous fillers include glass fibers, basalt fibers, aramid fibers, carbon fibers, carbon nanofibers, carbon nanotubes, carbon buckyballs, ultra high molecular weight polyethylene fibers, melamine fibers, polyamide fibers, cellulose fiber, metal fibers, potassium titanate whiskers, and aluminum borate whiskers.

Alternatively, or in addition to a particulate filler, the filler may be provided in the form of monofilament or multifilament fibers and may be used either alone or in combination with other types of fiber, through, for example, co-weaving or core/sheath, side-by-side, orange-type or matrix and fibril constructions, or by other methods known to one skilled in the art of fiber manufacture. Suitable co-woven structures include, for example, glass fiber-carbon fiber, carbon fiber-aromatic polyimide (aramid) fiber, and aromatic polyimide fiberglass fiber or the like. Fibrous fillers may be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Optionally, the fillers may be surface modified, for example treated so as to improve the compatibility of the filler and the polymeric portions of the compositions, which facilitates deagglomeration and the uniform distribution of fillers into the polymers. One suitable surface modification is the durable attachment of a coupling agent that subsequently bonds to the polymers. Use of suitable coupling agents may also improve impact, tensile, flexural, and/or dielectric properties in plastics and elastomers; film integrity, substrate adhesion, weathering and service life in coatings; and application and tooling properties, substrate adhesion, cohesive strength, and service life in adhesives and sealants. Suitable coupling agents include silanes, titanates, zirconates, zircoaluminates, carboxylated polyolefins, chromates, chlorinated paraffins, organosilicon compounds, and reactive cellulosics. The fillers may also be partially or entirely coated with a layer of metallic material to facilitate conductivity, e.g., gold, copper, silver, and the like.

In one embodiment, the reinforcing filler comprises glass fibers. For compositions ultimately employed for electrical uses, it is preferred to use fibrous glass fibers comprising lime-aluminum borosilicate glass that is relatively soda free, commonly known as "E" glass. However, other glasses are useful where electrical properties are not so important, e.g., the low soda glass commonly known as "C" glass. The glass fibers may be made by standard processes, such as by steam or air blowing, flame blowing and mechanical pulling. Preferred glass fibers for plastic reinforcement may be made by mechanical pulling. The diameter of the glass fibers is generally about 1 to about 50 micrometers, preferably about 1 to about 20 micrometers. Smaller diameter fibers are generally more expensive, and glass fibers having diameters of about 10 to about 20 micrometers presently offer a desirable balance of cost and performance. The glass fibers may be bundled into fibers and the fibers bundled in turn to yarns, ropes or rovings, or woven into mats, and the like, as is required by the particular end use of the composition. In preparing the molding compositions, it is convenient to use the filamentous glass in the form of chopped strands of about one-eighth to about 2 inches long, which usually results in filament lengths between about 0.0005 to about 0.25 inch in the molded compounds. Such glass fibers are normally supplied by the manufacturers with a surface treatment compatible with the polymer component of the composition, such as a siloxane, titanate, or polyurethane sizing, or the like.

When present in the composition, the filler may be used from about 0 to about 40 weight percent, based on the total weight of the composition. Within this range, it is preferred to use at least about 20 weight percent of the reinforcing filler. Also within this range, it is preferred to use up to about 70 weight percent, more preferably up to about 60 weight percent, of the reinforcing filler.

Flame-retardant additives are desirably present in an amount at least sufficient to reduce the flammability of the polyester resin, preferably to a UL94 V-0 rating. The amount will vary with the nature of the resin and with the efficiency of the additive. In general, however, the amount of additive will be from 1 to 30 percent by weight based on the weight of resin. A preferred range will be from about 5 to 20 percent.

Typically halogenated aromatic flame-retardants include tetrabromobisphenol A polycarbonate oligomer, polybromophenyl ether, brominated polystyrene, brominated imides, brominated polycarbonate, poly (haloaryl acrylate), poly (haloaryl methacrylate), or mixtures thereof. Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

The flame retardants are typically used with a synergist, particularly inorganic antimony compounds. Such compounds are widely available or can be made in known ways. Typical, inorganic synergist compounds include $Sb_2O_5$, $SbS_3$, sodium antimonate and the like. Especially preferred is antimony trioxide ($Sb_2O_3$). Synergists such as antimony oxides, are typically used at about 0.1 to 10 by weight based on the weight percent of resin in the final composition. Also, the final composition may contain polytetrafluoroethylene (PTFE) type resins or copolymers used to reduce dripping in flame retardant thermoplastics. Also other halogen-free flame retardants than the mentioned P or N containing compounds can be used, non limiting examples being compounds as Zn-borates, hydroxides or carbonates as Mg- and/or Al-hydroxides or carbonates, Si-based compounds like silanes or siloxanes, Sulfur based compounds as aryl sulphonates (including salts of it) or sulphoxides, Sn-compounds as stannates can be used as well often in combination with one or more of the other possible flame retardants.

Other additional ingredients may include antioxidants, and UV absorbers, and other stabilizers. Antioxidants include i) alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(alpha-methylcyclohexyl)-4,6 dimethylphenol, 2,6-di-octadecyl-4-methylphenol, 2,4,6,-tricyclohexyphenol, 2,6-di-tert-butyl-4-methoxymethylphenol; ii) alkylated hydroquinones, for example, 2,6-di-tert-butyl-4-methoxyphenol, 2,5-di-tert-butyl-hydroquinone, 2,5-di-tert-amyl-hydroquinone, 2,6-diphenyl-4octadecyloxyphenol; iii) hydroxylated thiodiphenyl ethers; iv) alkylidene-bisphenols; v) benzyl compounds, for example, 1,3,5-tris-(3,5-di-tert-butyl-4-hydroxybenzyl)-2,4,6-trimethylbenzene; vi) acylaminophenols, for example, 4-hydroxy-lauric acid anilide; vii) esters of beta-(3,5-di-tert-butyl-4-hydroxyphenol)-propionic acid with monohydric or polyhydric alcohols; viii) esters of beta-(5-tert-butyl-4-hydroxy-3-methylphenyl)-propionic acid with monohydric or polyhydric alcohols; vii) esters of beta-(5-tert-butyl-4-hydroxy-3-methylphenyl) propionic acid with mono- or polyhydric alcohols, e.g., with methanol, diethylene glycol, octadecanol, triethylene glycol, 1,6-hexanediol, pentaerythritol, neopentyl glycol, tris(hydroxyethyl) isocyanurate, thiodiethylene glycol, N,N-bis(hydroxyethyl) oxalic acid diamide. Typical, UV absorbers and light stabilizers include i) 2-(2'-hydroxyphenyl)-benzotriazoles, for example, the 5'methyl-, 3'5'-di-tert-butyl-,5'-tert-butyl-,5'(1,1,3,3-tetramethylbutyl)-, 5-chloro-3',5'-di-tert-butyl-,5-chloro-3'tert-butyl-5'methyl-, 3'sec-butyl-5'tert-butyl-,4'-octoxy,3',5'-ditert-amyl-3',5'-bis-(alpha, alpha-dimethylbenzyl)-derivatives; ii) 2.2 2-Hydroxy-benzophenones, for example, the 4-hydroxy-4-methoxy-,4-octoxy,4-decloxy-,4-dodecyloxy-,4-benzyloxy, 4,2',4'-trihydroxy- and 2'hydroxy-4,4'-dimethoxy derivative, and iii) esters of substituted and unsubstituted benzoic acids for example, phenyl salicylate, 4-tert-butylphenyl-salicilate, octylphenyl salicylate, dibenzoylresorcinol, bis-(4-tert-butylbenzoyl)-resorcinol, benzoylresorcinol, 2,4-di-tert-butylphenyl-3,5-di-tert-butyl-4-hydroxybenzoate and hexadecyl-3,5-di-tert-butyl-4-hydroxybenzoate.

The composition can further comprise one or more anti-dripping agents, which prevent or retard the resin from dripping while the resin is subjected to burning conditions. Specific examples of such agents include silicone oils, silica (which also serves as a reinforcing filler), asbestos, and fibrillating-type fluorine-containing polymers. Examples of fluorine-containing polymers include fluorinated polyolefins such as, for example, poly(tetrafluoroethylene), tetrafluoroethylene/hexafluoropropylene copolymers, tetrafluoroethylene/ethylene copolymers, polyvinylidene fluoride, poly(chlorotrifluoroethylene), and the like, and mixtures comprising at least one of the foregoing anti-dripping agents. A preferred anti-dripping agent is poly(tetrafluroethylene). When used, an anti-dripping agent is present in an amount of about 0.02 to about 2 weight percent, and more preferably from about 0.05 to about 1 weight percent, based on the total weight of the composition.

Dyes or pigments may be used to give a background coloration. Dyes are typically organic materials that are soluble in the resin matrix while pigments may be organic complexes or even inorganic compounds or complexes, which are typically insoluble in the resin matrix. These organic dyes and pigments include the following classes and examples: furnace carbon black, titanium oxide, zinc sulfide, phthalocyanine blues or greens, anthraquinone dyes, scarlet 3b Lake, azo compounds and acid azo pigments, quinacridones, chromophthalocyanine pyrrols, halogenated phthalocyanines, quinolines, heterocyclic dyes, perinone dyes, anthracenedione dyes, thioxanthene dyes, parazolone dyes, polymethine pigments and others.

In another embodiment, the quenchers are phosphorus containing derivatives, examples include but are not limited to diphosphites, phosphonates, metaphosphoric acid; arylphosphinic and arylphosphonic acids; polyols; carboxylic acid derivatives and combinations thereof. The amount of the quencher added to the thermoplastic composition is an amount that is effective to stabilize the thermoplastic composition. In one embodiment, the amount is at least about 0.001 weight percent, preferably at least about 0.01 weight percent, based on the total amount of the thermoplastic resin composition. The amount of quencher used is not more than the amount effective to stabilize the composition in order not to deleteriously affect the advantageous properties of said composition. In one embodiment, the amount can range from 0.001 or 0.01 weight percent, based on the total amount of the thermoplastic resin composition.

In one embodiment, an impact modifier can be added to the composition. In one embodiment, the impact modifiers can be present in amounts of 0 to 70 weight percent (wt. %) based on the total weight of the composition, specifically about 5 to about 20 wt. % based on the total weight of the composition. Impact modifiers, as used herein, include materials effective to improve the impact properties of polyesters.

Useful impact modifiers are substantially amorphous copolymer resins, including but not limited to acrylic rubbers, ASA rubbers, diene rubbers, organosiloxane rubbers, EPDM rubbers, SBS or SEBS rubbers, ABS rubbers, MBS rubbers and glycidyl ester impact modifiers.

The acrylic rubber is preferably core-shell polymers built up from a rubber-like core on which one or more shells have been grafted. Typical core material consists substantially of an acrylate rubber. Preferable the core is an acrylate rubber of derived from a C4 to C12 acrylate. Typically, one or more shells are grafted on the core. Usually these shells are built up for the greater part from a vinyl aromatic compound and/or a vinyl cyanide and/or an alkyl(meth)acrylate and/or (meth)acrylic acid. Preferable the shell is derived from an alkyl (meth)acrylate, more preferable a methyl(meth)acrylate. The core and/or the shell(s) often comprise multi-functional compounds that may act as a cross-linking agent and/or as a grafting agent. These polymers are usually prepared in several stages. The preparation of core-shell polymers and their use as impact modifiers are described in U.S. Pat. Nos. 3,864,428 and 4,264,487. Especially preferred grafted polymers are the core-shell polymers available from Rohm & Haas under the trade name PARALOID®, including, for example, PARALOID® EXL3691 and PARALOID® EXL3330, EXL3300 and EXL2300. Core shell acrylic rubbers can be of various particle sizes. In one embodiment, the range is from 50-800 nm. In another 600 nm embodiment, the range is from about 100 to about, however larger particles, or mixtures of small and large particles, may also be used. In some instances, especially where good appearance is required acrylic rubber with a particle size of 350-450 nm may be preferred. In other applications where higher impact is desired acrylic rubber particle sizes of 450-550 nm or 650-750 nm may be employed.

Acrylic impact modifiers contribute to heat stability and UV resistance as well as impact strength of polymer compositions. Other preferred rubbers useful herein as impact modifiers include graft and/or core shell structures having a rubbery component with a Tg (glass transition temperature) below 0° C., preferably between about −40° to about −80° C., which comprise poly-alkylacrylates or polyolefins grafted with poly(methyl)methacrylate or styrene-acrylonitrile copolymer. Preferably the rubber content is at least about 10% by weight, most preferably, at least about 50%.

Typical other rubbers for use as impact modifiers herein are the butadiene core-shell polymers of the type available from Rohm & Haas under the trade name PARALOID® EXL2600. Most preferably, the impact modifier will comprise a two stage polymer having a butadiene based rubbery core, and a second stage polymerized from methylmethacrylate alone or in combination with styrene. Impact modifiers of the type also include those that comprise acrylonitrile and styrene grafted onto cross-linked butadiene polymer, which are disclosed in U.S. Pat. No. 4,292,233 herein incorporated by reference.

Other suitable impact modifiers may be mixtures comprising core shell impact modifiers made via emulsion polymerization using alkyl acrylate, styrene and butadiene. These include, for example, methylmethacrylate-butadiene-styrene (MBS) and methylmethacrylate-butylacrylate core shell rubbers.

Among the other suitable impact modifiers are the so-called block copolymers and rubbery impact modifiers, for example, A-B-A triblock copolymers and A-B diblock copolymers. The A-B and A-B-A type block copolymer rubber additives which may be used as impact modifiers include thermoplastic rubbers comprised of one or two alkenyl aromatic blocks which are typically styrene blocks and a rubber block, e.g., a butadiene block which may be partially hydrogenated. Mixtures of these triblock copolymers and diblock copolymers are especially useful.

Suitable A-B and A-B-A type block copolymers are disclosed in, for example, U.S. Pat. Nos. 3,078,254, 3,402,159, 3,297,793, 3,265,765, and 3, 594,452 and U.K. Patent 1,264,741. Examples of typical species of A-B and A-B-A block copolymers include polystyrene-polybutadiene (SB), polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-polyisoprene-polystyrene and poly(α-methylstyrene)-polybutadiene-poly(α-methylstyrene), polystyrene-polymethylmethacrylate, as well as the selectively hydrogenated versions thereof, and the like. Mixtures comprising at least one of the aforementioned block copolymers are also useful. Such A-B and A-B-A block copolymers are available commercially from a number of sources, including Phillips Petroleum under the trademark SOLPRENE, Shell Chemical Co., under the trademark KRATON, Dexco under the trade name VECTOR, and Kuraray under the trademark SEPTON, ZYLAR from Nova.

The composition can also comprise a vinyl aromatic-vinyl cyanide copolymer. Suitable vinyl cyanide compounds include acrylonitrile and substituted vinyl cyanides such a methacrylonitrile. Preferably, the impact modifier comprises styrene-acrylonitrile copolymer (hereinafter SAN). The preferred SAN composition comprises at least 10, preferably 25 to 28, percent by weight acrylonitrile (AN) with the remainder styrene, para-methyl styrene, or alpha methyl styrene. Another example of SANs useful herein include those modified by grafting SAN to a rubbery substrate such as, for example, 1,4-polybutadiene, to produce a rubber graft polymeric impact modifier. High rubber content (greater than 50% by weight) resin of this type (HRG-ABS) may be especially useful for impact modification of polyester resins and their polycarbonate blends.

Another class of preferred impact modifiers, referred to as high rubber graft ABS modifiers, comprise greater than or equal to about 90% by weight SAN grafted onto polybutadiene, the remainder being free SAN. ABS can have butadiene contents between 12% and 85% by weight and styrene to acrylonitrile ratios between 90:10 and 60:40. Preferred compositions include: about 8% acrylonitrile, 43% butadiene and 49% styrene, and about 7% acrylonitrile, 50% butadiene and 43% styrene, by weight. These materials are commercially available under the trade names BLENDEX 336 and BLENDEX 415 respectively (Crompton Co.).

Improved impact strength is obtained by melt compounding polybutylene terephthalate with ethylene homo- and copolymers functionalized with either acid or ester moieties as taught in U.S. Pat. Nos. 3,405,198; 3,769,260; 4,327,764; and 4,364,280. Polyblends of polybutylene terephthalate with a styrene-alpha-olefin-styrene triblock are taught in U.S. Pat. No. 4,119,607; U.S. Pat. No. 4,172,859 teaches impact modification of polybutylene terephthalate with random ethylene-acrylate copolymers and EPDM rubbers grafted with a monomeric ester or acid functionality. Preferred impact modifiers include core-shell impact modifiers, such as those having a core of poly(butyl acrylate) and a shell of poly (methyl methacrylate).

Processes known for the formation of the foregoing elastomer-modified graft copolymers include mass, emulsion, suspension, and solution processes, or combined processes such as bulk-suspension, emulsion-bulk, bulk-solution or other techniques, using continuous, semibatch, or batch processes.

In one embodiment, the impact modifiers can be a co- or ter-polymer including units of ethylene and glycidyl methacrylate (GMA), sold by Arkema. Typical composition of such glycidyl ester impact modifier is about 67 wt % ethylene, 25 wt % methyl methacrylate and 8 wt % glycidyl methacrylate impact modifier, available from Atofina under the brand name LOTADER 8900). Another example of a carboxy reactive component that has impact modifying properties is a terpolymer made of ethylene, butyl acrylate and glycidyl methacrylate (e.g., the ELVALOY PT or PTW series from Dupont). In one embodiment the composition comprises mono or di epoxy compounds that do not act as a viscosity modifier.

In one embodiment of the present invention, the polyester resin composition has a molecular weight in the range from about 5000 to about 30000 as measured by gel permeation chromatography using polystyrene standards. In another embodiment the polyester resin has a molecular weight greater than about 20000.

In one embodiment, the composition can be made by conventional blending techniques. The production of the compositions may utilize any of the blending operations known for the blending of thermoplastics, for example blending in a kneading machine such as a Haake mixture, a Banbury mixer or an extruder. To prepare the composition, the components may be mixed by any known methods. In one embodiment, there are two distinct mixing steps: a premixing step and a melt-mixing step. In the premixing step, the dry ingredients are mixed together. The premixing step is typically performed using a tumbler mixer or ribbon blender. However, if desired, the premix may be manufactured using a high shear mixer such as a Henschel mixer or similar high intensity device. The premixing step is typically followed by a melt mixing step in which the premix is melted and mixed again as a melt. Alternatively, the premixing step may be omitted, and raw materials may be added directly into the feed section of a melt mixing device, preferably via multiple feeding systems. In the melt mixing step, the ingredients are typically melt kneaded in a single screw or twin screw extruder, a Banbury mixer, a two roll mill, or similar device.

In one embodiment, the ingredients are pre-compounded, pelletized, and then molded. Pre-compounding can be carried out in conventional equipment. For example, after pre-drying the polyester composition (e.g., for about four hours at about 120° C.), a single screw extruder may be fed with a dry blend of the ingredients; the screw employed having a long transition section to ensure proper melting. Alternatively, a twin-screw extruder with intermeshing co-rotating screws can be fed with resin and additives at the feed port and reinforcing additives (and other additives) may be fed downstream. The pre-compounded composition can be extruded and cut up into molding compounds such as conventional granules, pellets, and the like by standard techniques. The composition can then be molded in any equipment conventionally used for thermoplastic compositions, such as a Newbury type injection molding machine with conventional cylinder temperatures, at about 230° C. to about 280° C., and conventional mold temperatures at about 55° C. to about 95° C.

In one embodiment of the present invention, the polyesters are prepared by melt process. In one embodiment, the process may be a continuous polymerization process wherein the said reaction is conducted in a continuous mode in a train of reactors of at least two in series or parallel. In an alternate embodiment, the process can be a batch polymerization process wherein the reaction is conducted in a batch mode in a single vessel or in multiple vessels and the reaction can be conducted in two or more stages depending on the number of reactors and the process conditions. In an alternate embodiment, the process can be carried out in a semi-continuous polymerization process where the reaction is carried out in a batch mode and the additives are added continuously. Alternatively, the reaction is conducted in a continuous mode where the polymer formed is removed continuously and the reactants or additives are added in a batch process. In an alternate embodiment the product from at least one of the reactors can be recycled back into the same reactor intermittently by "pump around" to improve the mass transfer and kinetics of reaction. Alternatively the reactants and the additives are stirred in the reactors with a speed of about 25 revolutions per minute (here in after "rpm") to about 2500 rpm. The composition of the invention may also be made by conventional composite making processes like pultrusion, vacuum bagging, compression molding etc. In one embodiment of the present invention, the process can be carried out in air or in an inert atmosphere. The inert atmosphere can be either nitrogen or argon or carbon dioxide. The heating of the various ingredients can be carried out in a temperature between about 150° C. and about 300° C. and at a pressure of about 0.01 to 1 atmosphere. In one embodiment, the ingredients are heated to a temperature between 225° C. and about 250° C. and at a pressure of about 0.01 to 1 atmosphere to form the first mixture. In one embodiment, the polyester is recovered by isolating the polymer followed by grinding or by extruding the hot polymer melt, cooling and pelletizing.

In one embodiment of the present invention, a catalyst can be employed. The catalyst can be an acidic, or basic or a transition metal based catalyst. The catalyst can be any of the catalysts commonly used in the prior art such as alkaline earth metal oxides such as magnesium oxides, calcium oxide, barium oxide and zinc oxide; alkali and alkaline earth metal salts; a Lewis catalyst such as tin or titananium compounds; a nitrogen-containing compound such as tetra-alkyl ammonium hydroxides used like the phosphonium analogues, e.g., tetra-alkyl phosphonium hydroxides or acetates. The Lewis acid catalysts and the aforementioned metal oxide or salts can be used simultaneously. In one embodiment, the catalyst is not a tertiary amine or an alkali metal hydroxide.

The reaction can be conducted optionally in presence of a solvent or in neat conditions without the solvent. The organic solvent used in the above process according to the invention should be capable of dissolving the polyester to an extent of at least 0.01 g/per ml at 25° C. and should have a boiling point in the range of 140-290° C. at atmospheric pressure. Preferred examples of the solvent include but are not limited to amide solvents, in particular, N-methyl-2-pyrrolidone; N-acetyl-2-pyrrolidone; N,N'-dimethyl formamide; N,N'-dimethyl acetamide; N,N'-diethyl acetamide; N,N'-dimethyl propionic acid amide; N,N'-diethyl propionic acid amide; tetramethyl urea; tetraethyl urea; hexamethylphosphor triamide; N-methyl caprolactam and the like. Other solvents can also be employed, for example, methylene chloride, chloroform, 1,2-dichloroethane, tetrahydrofuran, diethyl ether, dioxane, benzene, toluene, chlorobenzene, o-dichlorobenzene and the like.

The molten mixture of the polyester may be obtained in particulate form, example by pelletizing or grinding the composition. The composition of the present invention can be molded into useful articles by a variety of means by many different processes to provide useful molded products such as injection, extrusion, profile extrusion, film or sheet, plutrusion, rotation, foam molding calender molding, blow molding, thermoforming, compaction, melt spinning, fiber spinning to form articles. Non-limiting examples of the various articles that could be made from the thermoplastic composition of the present invention include electrical connectors, electrical devices, computers, building and construction, outdoor equipment. The articles made from the composition of the present invention may be used widely in house ware objects such as food containers and bowls, home appliances, as well as films, electrical connectors, electrical devices, computers, building and construction, outdoor equipment, trucks and automobiles. In one embodiment, the polyester may be blended with other conventional polymers.

Compositions of the invention may be converted to articles using common thermoplastic processes such as film and sheet extrusion, injection molding, gas-assist injection molding, extrusion molding, compression molding and blow molding. Film and sheet extrusion processes may include and are not limited to melt casting, blown film extrusion and calendering. Co-extrusion and lamination processes may be employed to form composite multi-layer films or sheets.

Film and sheet of the invention may alternatively be prepared by casting a solution or suspension of the composition in a suitable solvent onto a substrate, belt or roll followed by removal of the solvent. Single or multiple layers of coatings may further be applied to the single or multi-layer substrates to impart additional properties such as scratch resistance, ultra violet light resistance, aesthetic appeal, etc. Coatings may be applied through standard application techniques such as rolling, spraying, dipping, brushing, or flow-coating.

Oriented films may be prepared through blown film extrusion or by stretching cast or calendered films in the vicinity of the thermal deformation temperature using conventional stretching techniques. For instance, a radial stretching pantograph may be employed for multi-axial simultaneous stretching; an x-y direction stretching pantograph can be used to simultaneously or sequentially stretch in the planar x-y directions. Equipment with sequential uniaxial stretching sections can also be used to achieve uniaxial and biaxial stretching, such as a machine equipped with a section of differential speed rolls for stretching in the machine direction and a tenter frame section for stretching in the transverse direction.

Compositions of the invention may be converted to multi-wall sheet comprising a first sheet having a first side and a second side, wherein the first sheet comprises a thermoplastic polymer, and wherein the first side of the first sheet is disposed upon a first side of a plurality of ribs; and a second sheet having a first side and a second side, wherein the second sheet comprises a thermoplastic polymer, wherein the first side of the second sheet is disposed upon a second side of the plurality of ribs, and wherein the first side of the plurality of ribs is opposed to the second side of the plurality of ribs.

The films and sheets described above may further be thermoplastically processed into shaped articles via forming and molding processes including but not limited to thermoforming, vacuum forming, pressure forming, injection molding and compression molding. Multi-layered shaped articles may also be formed by injection molding a thermoplastic resin onto a single or multi-layer film or sheet substrate as described. In one embodiment, by providing a single or multi-layer thermoplastic substrate having optionally one or more colors on the surface, for instance, using screen printing or a transfer dye. In another embodiment, conforming the substrate to a mold configuration such as by forming and trimming a substrate into a three dimensional shape and fitting the substrate into a mold having a surface which matches the three dimensional shape of the substrate. In yet another embodiment, injecting a thermoplastic resin into the mold cavity behind the substrate to (i) produce a one-piece permanently bonded three-dimensional product or (ii) transfer a pattern or aesthetic effect from a printed substrate to the injected resin and remove the printed substrate, thus imparting the aesthetic effect to the molded resin.

Those skilled in the art will also appreciate that common curing and surface modification processes including and not limited to heat-setting, texturing, embossing, corona treatment, flame treatment, plasma treatment and vacuum deposition may further be applied to the above articles to alter surface appearances and impart additional functionalities to the articles. Accordingly, another embodiment of the invention relates to articles, sheets and films prepared from the compositions above.

Compositions of the present invention and articles derived from the composition can have useful properties. In an advantageous feature, polyester compositions of the present invention and articles derived from the composition have a glass transition temperature of at least 60° C. In another embodiment the polyester compositions have a glass transition of at least 70° C. In another embodiment the polyester composition may be transparent or translucent. The term "transparent" as used herein would refer to a composition that transmits at least 70% in the region ranging from 250 nm to 700 nm with a haze of less than 10%. The term "translucent" as used herein would refer to a composition that transmits at least 60% in the region ranging from 250 nm to 700 nm with a haze of less than 40%. The high glass transition temperature and good optical properties can be obtained without significant degradation of the other properties such as tensile properties. In one embodiment, the compositions and articles derived from the polyester compositions have good heat, mechanical properties and good optical properties. In one embodiment, the composition has a transmission of at least 75%. In another embodiment, the composition has a transmission of at least 85%. In yet another embodiment, the composition has a haze of less than 40%, and in another embodiment, the composition has a haze of less than 10%. In another embodiment, the composition has a haze of less than 5%.

Accordingly, the invention provides previously unavailable advantages of a balance combination of optical properties and heat for polyester compositions by employing a process of using appropriate polycarbonates derived from a structure (II) and a second aromatic dihydroxy compounds. In one embodiment, the balance of the optical and heat properties are obtained without the consequent loss or degradation of other desirable characteristics. Typically, it is difficult to obtain high heat, good optical, and good mechanicals in a particular polymer composition. In one embodiment, these improved optical and heat is obtained together with mechanical properties render the compositions suitable for injection molding.

Compositions of the present invention and articles derived from the composition can have useful properties. In an advantageous feature, polyester compositions of the present invention and articles derived from the composition a good balance of optical properties, flow, ductility and good scratch properties without the consequent loss or degradation of other desirable characteristics. In one embodiment, these improved optical and heat is obtained together with mechanical properties render the compositions suitable for injection molding.

The invention is further described in the following illustrative examples in which all parts and percentages are by weight unless otherwise indicated.

EXAMPLES

Materials

Table 1 provides the details of the materials and the source from where they were procured.

TABLE 1

| Component | Description | Source |
| --- | --- | --- |
| PC | Polycarbonate resin (Mw = 30,000 g/mol, PC standards) | GE Plastics |
| 25DMBPC | Poly(25 mole % 1,1-bis-(4-hydroxy3-methyphenyl)cyclohexane)-co-(75 mole % bisphenol-A carbonate) copolymer (Mw = 30,000 g/mol, PC standards) | GE Plastics |
| 50DMBPC | Poly(50 mole % 1,1-bis-(4-hydroxy3-methyphenyl)cyclohexane)-co-(50 mole % bisphenol-A carbonate) copolymer (Mw = 23,500 g/mol, PC standards) | GE Plastics |
| 100DMBPC | Poly(1,1-bis-(4-hydroxy3-methyphenyl)cyclohexane)carbonate (Mw = 25,000 g/mol, PC standards) | GE Plastics |
| PCT | Poly(1,4-cyclohexanedimethylene, terephthalate) (Mw = 70,000 g/mol PS standards) | Eastman Chemical |
| PCTG | Poly(20 mol % ethylene terephthalate)-co-(80 mol % 1,4-cyclohexanedimethylene terephthalate) (Mw = 70,000 g/mol, PS standards) | Eastman Chemical |

TABLE 1-continued

| Component | Description | Source |
| --- | --- | --- |
| PETG | Poly(70 mol % ethylene terephthalate)-co-(30 mol % 1,4-cyclohexanedimethylene terephthalate) (Mw = 70,000 g/mol, PS standards) | Eastman Chemical |
| ITR20 | Poly(20 wt % isophthalate-terephthalate-resorcinol ester)-co-(80 wt % bisphenol-A carbonate) copolymer (Mw = 30,000 g/mol, PC standards) | GE Plastics |

Procedure/Techniques

General Procedure

The ingredients of the examples shown below in Tables 2 to 11, were extruded on a 25 mm Werner Pfleiderer Twin Screw Extruder with a vacuum vented mixing screw, at a barrel and die head temperature between 240 and 265° C. and 150 to 300 rpm screw speed. The extruder has 8 independent feeders for different raws and can be operated at a maximum rate of 300 lbs/hr. The extrudate was cooled through a water bath prior to pelletizing. Test parts were injection molded on a van Dorn molding machine with a set temperature of approximately 240 to 265° C. The pellets were dried for 3-4 hours at 120° C. in a forced air-circulating oven prior to injection molding.

Results and Discussion

Examples 1-4 (Ex.1-Ex.4) and Comparative Example 1-4(CEx.1-CEx.4)

Examples 1-3 (Ex.1-Ex.3) were prepared using the general procedure described above with varying ratios (in weight percent) of the PCTG polyester and 25 DMBPC (poly(25 mole % 1,1-bis-(4-hydroxy3-methyphenyl)cyclohexane)-co-(50 mole % bisphenol-A carbonate) copolymer) as given in Table 2. Example 4 (Ex.4) was prepared using the general procedure described above with 20 weight percent of the PCTG polyester and about 80 weight percent of 50 DMBPC (poly(50 mole % 1,1-bis-(4-hydroxy3-methyphenyl)cyclohexane)-co-(50 mole % bisphenol-A carbonate) copolymer).

The comparative examples 1-4 (CEx. 1-CEx.4) were synthesized using the general procedure given above with PCTG expect that the amount of the DMBPC in the copolycarbonate was greater than 25 weight percent. Comparative example 1 was prepared by the above method with 50 weight percent PCTG and 50 weight percent of 50 DMBPC (poly(50 mole % 1,1-bis-(4-hydroxy3-methyphenyl)cyclohexane)-co-(50 mole % bisphenol-A carbonate) copolymer). Comparative examples 2-4 (CEx.2-CEx.4) were prepared using the general procedure described above with varying ratios (in weight percent) of the PCTG polyester and 100 DMBPC (poly(100 mole % 1,1-bis-(4-hydroxy3-methyphenyl)cyclohexane) polymer) as given in Table 2.

It can be seen from Table 2 that addition of the polyester to the blend improved the optical properties and the impact properties of the composition without affecting the heat stability. The compositions are transparent when the amount of DMBPC content in the DMBPC copolymer is less than 25 mole % (See Ex. 1-4 and CEX. 1-CEX.4).

TABLE 2

|  | Ex. 1 | Ex. 2 | Ex. 3 | Ex. 4 | CEx. 1 | CEx. 2 | CEx. 3 | CEx. 4 |
|---|---|---|---|---|---|---|---|---|
| 25-DMBPC (weight percent) | 75 | 50 | 25 | — | — | — | — | — |
| 50-DMBPC (weight percent) | — | — | — | 80 | 50 | — | — | — |
| 100-DMBPC (weight percent) | — | — | — | — | — | 75 | 50 | 25 |
| DMBPC content in blend (mole percent) | 21.48 | 14.32 | 7.16 | 43.68 | 27.30 | 75 | 50 | 25 |
| PCTG (weight percent) | 25 | 50 | 75 | 20 | 50 | 25 | 50 | 75 |
| Transmission | 85 | 85 | 75 | 70 | <50 | <50 | <50 | <50 |
| Haze (%) | 3 | 4 | 15 | 27 | >50 | >50 | >50 | >50 |
| HDT @ 1.82 Mpa | 112 | 94 | 80 | 107 | 88 | 102 | 87 | 74 |
| MAI Total Energy @ 23° C. | 80 | 71 | 65 | 62 | 72 | 2 | 67 | 55 |

Examples 5-15 (Ex.5-Ex.15) and Comparative Examples 5-6 (CEx.5 and CEx.6)

Examples 5-15 (Ex.5-Ex.15) and comparative examples 5 and 6 (CEx.5 and CEx.6) were prepared using the general procedure described above with varying amounts of PCTG polyester, 50 DMBPC (poly(50 mole % 1,1-bis-(4-hydroxy3-methyphenyl)cyclohexane)-co-(50 mole % bisphenol-A carbonate) copolymer) and polycarbonate as shown in Table 3.

Table 3 shows that the transparency in the ternary blends of 50-DMBPC/PC/PCTG was obtained at certain ratios of the 3 components in the blend. The optical property of the compositions improved while not affecting the heat stability or the mechanical properties.

TABLE 3

|  | Ex. 5 | Ex. 6 | Ex. 7 | Ex. 8 | Ex. 9 | Ex. 10 | Ex. 11 | Ex. 12 | Ex. 13 | Ex. 14 | Ex. 15 | CEx. 5 | CEx. 6 |
|---|---|---|---|---|---|---|---|---|---|---|---|---|---|
| PC (weight percent) | 75 | 50 | 30 | 10 | 10 | 25 | 25 | 25 | 35.0 | 35.0 | 30.0 | 10 | 10 |
| 50-DMBPC (weight percent) | 0 | 25 | 45 | 65 | 72 | 60 | 38 | 23 | 15 | 32 | 25 | 18 | 45 |
| PCTG (weight percent) | 25 | 25 | 25 | 25 | 18 | 15 | 38 | 53 | 50.0 | 32.5 | 45.0 | 72 | 45 |
| Transmission | 88 | 86 | 87 | 68 | 87 | 88 | 79 | 79 | 87.9 | 87.2 | 84.5 | 61 | 54 |
| Haze (%) | 2 | 3 | 3 | 30 | 3 | 1 | 10 | 14 | 1.4 | 2.1 | 4.8 | >50 | >50 |
| MAI Total Energy @ 23° C. | 67 | 75 | 68 | 76 | 71 | 76 | 69 | 64 | 66.9 | 70.1 | 67.0 | 66 | 73 |
| HDT @ 1.82 Mpa | 124 | 121 | 119 | 119 | 109 | 111 | 99 | 93 | 96.5 | 106.1 | 99.5 | 80 | 93 |

Examples 16-23 (Ex.516-Ex.23) and Comparative Examples 7-10 (CEx.7-CEx. 10)

Examples 16-23 (Ex.15-Ex.23) and comparative examples 7-10 (CEx.7-CEx. 10) were prepared using the general procedure described above with varying amounts of PCTG polyester, 50 DMBPC (poly(50 mole % 1,1-bis-(4-hydroxy3-methyphenyl)cyclohexane)-co-(50 mole % bisphenol-A carbonate) copolymer) and ITR20 as shown in Table 4.

Table 4 shows that the transparency in the ternary blends of 50-DMBPC/ITR20/PCTG was obtained at certain ratios of the 3 components in the blend. The optical property of the compositions improved while not affecting the heat stability or the mechanical properties.

TABLE 4

|  | CEx. 7 | CEx. 8 | CEx. 9 | CEx. 10 | Ex. 16 | Ex. 17 | Ex. 18 | Ex. 19 | Ex. 20 | Ex. 21 | Ex. 22 | Ex. 23 |
|---|---|---|---|---|---|---|---|---|---|---|---|---|
| ITR20 (weight percent) | 10 | 10 | 25.0 | 25.0 | 10 | 25 | 25 | 25 | 40.0 | 40.0 | 40.0 | 35.0 |
| 50-DMBPC (weight percent) | 18 | 45 | 37 | 22 | 72 | 60 | 37.5 | 22.5 | 45 | 30 | 15 | 32 |
| PCTG (weight percent) | 72 | 45 | 37.5 | 52.5 | 18 | 15 | 37.5 | 52.5 | 15.0 | 30.0 | 45.0 | 32.5 |
| Transmission | 60 | 56 | 65.0 | 57.8 | 79 | 85 | 74 | 72 | 72.9 | 72.5 | 71.0 | 67.5 |
| Haze (%) | 66 | 75 | 43.7 | 64.7 | 13 | 6 | 33 | 38 | 24.9 | 25.7 | 29.7 | 37.3 |
| MAI Total Energy @ 23° C. | 55 | 71 | 67.6 | 65.0 | 66 | 16 | 68 | 67 | 70.7 | 69.5 | 66.3 | 70.7 |
| Tensile Modulus | 1940 | 2250 | 2330.0 | 2190.0 | 2590 | 2640 | 2350 | 2160 | 2530.0 | 2380.0 | 2220.0 | 2370.0 |
| Elongation @ break | 170 | 130 | 96.7 | 124.5 | 72 | 43 | 110 | 130 | 57.3 | 89.2 | 112.9 | 113.6 |
| HDT @ 1.82 Mpa | 79 | 90 | 101.5 | 92.0 | 111 | 110 | 96 | 91 | 112.1 | 105.1 | 97.6 | 103.3 |
| MVR @ 265° C./2.16 kg | 20 | 15 | 9.18 | 11.82 | 8 | 10 | 13 | 13 | 7.85 | 9.08 | 10.81 | 8.35 |

Examples 24-25 (Ex.24-Ex.25) and Comparative Example 11 (CEx. 11)

Examples 24 and 25 (Ex.24-Ex.25) and comparative example 11 were prepared using the general procedure described above with varying ratios (in weight percent) of the PCTG polyester and 100 DMBPC (poly(100 mole % 1,1-bis-(4-hydroxy3-methyphenyl)cyclohexane)polymer), and polycarbonate PC as given in Table 5.

From Table 5 it is seen that the transparency in ternary blends of 100-DMBPC/PCTG/PC obtained at certain ratios of the 3 components in the blend. The optical property improved in the Ex.24 and Ex.25 while maintaining the mechanical properties.

TABLE 5

|  | CEx. 11 | Ex. 24 | Ex. 25 |
|---|---|---|---|
| PC (weight percent) | 30 | 50 | 70 |
| 100-DMBPC (weight percent) | 35 | 25 | 15 |

TABLE 5-continued

|  | CEx. 11 | Ex. 24 | Ex. 25 |
|---|---|---|---|
| PCTG (weight percent) | 35 | 25 | 15 |
| Transmission | 60 | 85 | 84 |
| Haze (%) | 46 | 4 | 11 |
| MAI Total Energy @ 23° C. | 69 | 72 | 73 |
| Tensile Modulus | 2370 | 2310 | 2330 |
| Elongation @ break | 108 | 104 | 115 |

Examples 26-29 (CEx.26-CEx.29) and Comparative Examples 12-17 (CEx.12-CEx. 17)

The examples 26-29 (Ex.26-Ex.29) and comparative examples 12-17 (CEx.12-CEx.17) were prepared using the general procedure given above with varying amounts of PCT as the polyester component. Examples 26 and 27 (Ex.26-Ex.27) and comparative example 12 (CEx.12) were synthesized with varying amount of PCT polyester, and 25 DMBPC (poly(25 mole % 1,1-bis-(4-hydroxy3-methyphenyl)cyclohexane)-co-(75 mole % bisphenol-A carbonate) copolymer). Examples 28 and 29 (Ex.28-Ex.29) and comparative examples 13 and 14 (CEx.13 and CEx.14) were synthesized with varying amount of PCT polyester, and 50 DMBPC (poly (50 mole % 1,1-bis-(4-hydroxy3-methyphenyl)cyclohexane)-co-(50 mole % bisphenol-A carbonate) copolymer). While comparative examples 15-17 (CEx.15-CEx.17) were synthesized with varying amount of PCT polyester, and 100 DMBPC (poly(100 mole % 1,1-bis-(4-hydroxy3-methyphenyl)cyclohexane)polymer).

Table 6 depicts that the transparency (Haze value of <10%) or translucency (Haze value of <40%) is dependent on the amount of the DMBPC content and polyester (PCT polyester) content in the composition. It may be seen that the mechanical properties and heat stability is maintained while having good optical properties (for example see Ex.26 and CEx.12 in Table 6).

TABLE 6

|  | Ex. 26 | Ex. 27 | Ex. 28 | Ex. 29 | CEx. 12 | CEx. 13 | CEx. 14 | CEx. 15 | CEx. 16 | CEx. 17 |
|---|---|---|---|---|---|---|---|---|---|---|
| 25-DMBPC (wt. Percent) | 75 | 50 |  |  | 25 |  |  |  |  |  |
| 50-DMBPC (wt. Percent) |  |  | 80 | 60 |  | 40 | 20 |  |  |  |
| 100-DMBPC (wt. Percent) |  |  |  |  |  |  |  | 75 | 50 | 25 |
| DMBPC content in blend | 21.48 | 14.32 | 43.68 | 32.76 | 7.16 | 21.84 | 10.92 | 75 | 50 | 25 |
| PCT (wt. Percent) | 25 | 50 | 20 | 40 | 75 | 60 | 80 | 25 | 50 | 75 |
| Transmission | 86 | 70 | 88 | 60 | <50 | <50 | <50 | <50 | <50 | <50 |
| Haze | 3 | 18 | 1 | 30 | >50 | >50 | >50 | >50 | >50 | >50 |
| HDT @ 1.82 Mpa | 113 | 99 | 109 | 100 | 87 | 92 | 86 | 105 | 95 | 87 |
| MAI Total Energy @ 23° C. | 80 | 71 | 76 | 73 | 50 | 72 | 20 | 3 | 75 | 41 |
| Tensile Modulus | 2340 | 2030 | 2394 | 2210 | 1970 | 2180 | 2120 | 2790 | 2400 | 2120 |
| Elongation @ break | 112 | 124 | 80 | 80 | 114 | 80 | 120 | 52 | 119 | 22 |

Examples 30-31 (Ex.30 and Ex.31) and Comparative Examples 18-24 (CEx.18-CEx. 24)

The examples 30 and 31 (Ex.30 and Ex.31) and comparative examples 19-24 (CEx.18-CEx.24) were prepared using the general procedure given above with varying amounts of PCT polyester, and 50 DMBPC (poly(50 mole % 1,1-bis-(4-hydroxy3-methyphenyl)cyclohexane)-co-(50 mole % bisphenol-A carbonate) copolymer), as given in Table 7. While comparative example 18 (CEx.18) was synthesized using the general procedure except that there was no PCT polyester.

Examples showed good resistance to scratch and good optical properties while maintaining the mechanical properties (for example see Ex.30, Ex.31, and CEx.20. CEx.21 in Table 7).

TABLE 7

|  | CEx. 18 | CEx. 19 | CEx. 20 | CEx. 21 | CEx. 22 | CEx. 23 | CEx. 24 | Ex. 30 | Ex. 31 |
|---|---|---|---|---|---|---|---|---|---|
| 50-DMBPC (wt. Percent) | 100 | 95 | 90 | 80 | 75 | 70 | 65 | 86 | 82 |
| PCT (wt. Percent) |  | 5 | 10 | 20 | 25 | 30 | 35 | 14 | 18 |
| % Transmission | 89 | 87 | 89 | 88 | 89 | 88 | 86 | 89 | 89 |
| % Haze | 1 | 4.1 | 0.8 | 1 | 1.1 | 3.1 | 7.3 | 0.9 | 0.8 |
| HDT @ 1.82 MPa | 116 | 118 | 115 | 108 | 108 | 106 | 104 | 114 | 112 |
| Modulus of Elasticity | 2700 | 2450 | 2610 | 2394 | 2390 | 2280 | 2240 | 2320 | 2290 |
| Elongation at Break | 37 | 64.7 | 65.2 | 75 | 70 | 62.9 | 52.9 | 71.9 | 76.3 |
| Pencil hardness (1 kgf - RT) | H | F | F | HB | HB | HB | HB | F | F |

TABLE 7-continued

|  | CEx. 18 | CEx. 19 | CEx. 20 | CEx. 21 | CEx. 22 | CEx. 23 | CEx. 24 | Ex. 30 | Ex. 31 |
|---|---|---|---|---|---|---|---|---|---|
| MAI Total Energy @ 23° C. | 19 | 42.9 | 67.2 | 71.8 | 74.6 | 74.9 | 80 | 74.5 | 78.4 |
| INI @ 23° C. | 25.3 | 31.2 | 28.8 | 30 | 31.6 | 29.2 | 35.1 | 26.8 | 26.1 |
| Unnotched Izod @ 23 C. | NB | NB | NB | NB | NB | NB | NB | NB | NB |

Examples 32-46 (Ex.32-Ex.46)

Examples 32-40 (Ex.32-Ex.40) were prepared using the general procedure described above with varying amounts of PCT polyester, 50 DMBPC (poly(50 mole % 1,1-bis-(4-hydroxy3-methyphenyl)cyclohexane)-co-(50 mole % bisphenol-A carbonate) copolymer) and ITR20 as shown in Table 8. Examples 41-46 (Ex.41-Ex.46) were prepared using the general procedure described above with varying amounts of PCT polyester, 50 DMBPC (poly(50 mole % 1,1-bis-(4-hydroxy3-methyphenyl)cyclohexane)-co-(50 mole % bisphenol-A carbonate) copolymer) and Polycarbonate as shown in Table 8.

Table 8 shows that the transparency in the ternary blends of 50-DMBPC/ITR20/PCT and 50-DMBPC/PC/PCT was obtained at certain ratios of the 3 components in the blend. The optical property of the compositions improved while not affecting the heat stability or the mechanical properties. It may be seen that the compositions with PC showed good mechanical (impact total energy >40 J) and optical (haze <40%) properties.

TABLE 9

|  | Ex. 47 | Ex. 48 | Ex. 49 |
|---|---|---|---|
| 100-DMBPC (wt. Percent) | 35 | 25 | 15 |
| PC (wt. percent) | 30 | 50 | 70 |
| PCT (wt. percent) | 35 | 25 | 15 |
| % Transmission | 79 | 88 | 88 |
| % Haze | 10 | 1 | 1 |
| HDT @ 1.82 Mpa | 106 | 112 | 120 |
| MAI Total Energy @ 23° C. | 73 | 73 | 74 |
| Modulus of Elasticity | 2240 | 2250 | 2270 |
| Elongation at Break | 106 | 104 | 107 |

Examples 50-57 (Ex.50-Ex.57) and Comparative Example 25-31 (CEx.25-CEx. 31)

Examples 50-57 (Ex.50-Ex.57) and comparative examples 25-31 (CEx.25-CEx. 31) were prepared using the general

TABLE 8

|  | Ex. 32 | Ex. 33 | Ex. 34 | Ex. 35 | Ex. 36 | Ex. 37 | Ex. 38 | Ex. 38 | Ex. 40 | Ex. 41 | Ex. 42 | Ex. 43 | Ex. 44 | Ex. 45 | Ex. 46 |
|---|---|---|---|---|---|---|---|---|---|---|---|---|---|---|---|
| 50-DMBPC (Wt. percent) | 25 | 42.5 | 60 | 14 | 35 | 42 | 24 | 40 | 56 | 25 | 42.5 | 60 | 14 | 35 | 42 |
| ITR20 (Wt. percent) | 15 | 15 | 15 | 30 | 30 | 30 | 20 | 20 | 20 | — | — | — | — | — | — |
| PC (Wt. percent) | — | — | — | — | — | — | — | — | — | 15 | 15 | 15 | 30 | 30 | 30 |
| PCT (Wt. percent) | 60 | 43 | 25 | 56 | 35 | 28 | 56 | 40 | 24 | 60 | 43 | 25 | 56 | 35 | 28 |
| % Transmission | 76 | 73 | 79 | 87 | 83 | 83 | 76 | 78 | 81 | 88 | 87 | 87 | 88 | 88 | 87 |
| % Haze | 32 | 27 | 18 | 4 | 12 | 9 | 23 | 20 | 11 | 2 | 2 | 2 | 2 | 2 | 2 |
| HDT @ 1.82 Mpa | 91 | 99 | 108 | 92 | 102 | 107 | 93 | 101 | 108 | 90 | 99 | 109 | 92 | 105 | 108 |
| MAI Total Energy @ 23° C. | 64 | 69 | 70 | 64 | 68 | 71 | 65 | 71 | 72 | 66 | 67 | 64 | 64 | 73 | 71 |
| Tensile Modulus | 1920 | 2170 | 2390 | 1940 | 2210 | 2310 | 1960 | 2180 | 2340 | 1900 | 2160 | 2360 | 1920 | 2190 | 2260 |
| Elongation at Break | 138 | 124 | 82 | 129 | 107 | 107 | 140 | 125 | 90 | 120 | 97 | 124 | 145 | 121 | 93 |

Examples 47-49 (Ex.47-Ex.49)

Examples 47-49 (Ex.47-Ex.49) were prepared using the general procedure described above with varying amounts of PCT polyester, 100 DMBPC (poly(100 mole % 1,1-bis-(4-hydroxy3-methyphenyl)cyclohexane) polymer) and Polycarbonate as shown in Table 9.

Table 9 shows that the optical property of the compositions improved while not affecting the heat stability or the mechanical properties. It may be seen that the compositions procedure described above with varying amounts of PETG polyester, 50 DMBPC (poly(50 mole % 1,1-bis-(4-hydroxy3-methyphenyl)cyclohexane)-co-(50 mole % bisphenol-A carbonate) copolymer) and ITR20 as shown in Table 10.

Table 10 shows that the optical property of the compositions improved while not affecting the heat stability or the mechanical properties. It may be seen that the compositions with PC showed good mechanical (impact total energy >40 J) and optical (haze <40%) properties.

TABLE 10

|  | Ex. 50 | Ex. 51 | Ex. 52 | Ex. 53 | Ex. 54 | Ex. 55 | Ex. 56 | Ex. 57 | CEx. 25 | CEx. 26 | CEx. 27 | CEx. 28 | CEx. 29 | CEx. 30 | CEx. 31 |
|---|---|---|---|---|---|---|---|---|---|---|---|---|---|---|---|
| 50-DMBPC (wt. percent) | 52.5 | 10 | 25 | 40 | 40 | 40 | 30 | 20 | 15 | 37.5 | 25 | 15 | 80 | 50 | 20 |
| ITR20 (wt. percent) | 25 | 50 | 50 | 50 | 35.0 | 45.0 | 45.0 | 45.0 | 25 | 25 | 35.0 | 35.0 | 0 | 0 | 0 |
| PETG (wt. percent) | 22.5 | 40 | 25 | 10 | 25.0 | 15.0 | 25.0 | 35.0 | 60 | 37.5 | 40.0 | 50.0 | 20 | 50 | 80 |
| Transmission | 80 | 85 | 87 | 84 | 77.0 | 79.8 | 78.4 | 77.0 | 70 | 74 | 72.2 | 72.0 | <50 | <50 | <50 |
| Haze | 18 | 6 | 2 | 3 | 19.8 | 13.5 | 16.3 | 20.6 | 61 | 50 | 39.5 | 41.0 | >50 | >50 | >50 |
| HDT @ 1.82 MPa | 122 | 101 | 118 | 125 | 114.4 | 122.5 | 116.2 | 106.3 | 86 | 106 | 99.9 | 92.1 | — | 89 | 67 |
| MVR @ 265° C./2.16 kg | 12 | 18 | 13 | 9 | 13.95 | 10.99 | 12.52 | 15.42 | 31 | 19 | 18.08 | 21.87 | 9 | 20 | 29 |
| Tensile Modulus | 2640 | 2590 | 2680 | 2740 | 2660.0 | 2620.0 | 2550.0 | 2500.0 | 2420 | 2580 | 2600.0 | 2530.0 | — | 2540 | 2270 |
| Elongation @ break | 100 | 120 | 98 | 100 | 90.2 | 124.3 | 96.3 | 114.0 | 120 | 120 | 83.3 | 82.2 | — | 140 | 110 |

Examples 58-59 (Ex.58-Ex.59) and Comparative Example 32-33 (CEx.32-CEx. 33)

Examples 58-59 (Ex.58-Ex.59) and comparative examples 32-33 (CEx.32-CEx. 33) were prepared using the general procedure described above with varying amounts of PETG polyester, 100 DMBPC (poly(100 mole % 1,1-bis-(4-hydroxy3-methyphenyl)cyclohexane)polymer) and ITR20 as shown in Table 11. Table 11 shows that the optical property of the compositions improved while not affecting the heat stability or the mechanical properties.

TABLE 11

|  | Ex. 58 | Ex. 59 | CEx. 32 | CEx. 33 |
|---|---|---|---|---|
| 100-DMBPC (wt. percent) | 25 | 15 | 50 | 35 |
| ITR20 (wt. percent) | 50 | 70 | — | 30 |
| PETG (wt. percent) | 25 | 15 | 50 | 35 |
| Transmission | 87 | 84 | No stranding | No stranding |
| Haze | 6 | 10 | No stranding | No stranding |
| HDT @ 1.82 Mpa | 99 | 106 | — | — |
| MVR @ 265° C./2.16 kg | 23 | 17 | — | — |
| Modulus | 2620 | 2570 | — | — |
| Elongation @ break | 100 | 115 | — | — |

The following testing procedures were used.

Melt Volume Rate (MVR) on pellets (dried for 2 hours at 120° C. prior to measurement) was measured according to ISO 1133 method at dwelling time of 240 seconds and 0.0825 inch (2.1 mm) orifice.

In other cases, injection molded parts were tested by ASTM. Notched Izod testing as done on 3×½×⅛ inch (76.2× 12.7×3.2 mm) bars using ASTM method D256. Bars were notched prior to oven aging; samples were tested at room temperature. Tensile elongation at break was tested on 7×⅛ in. (177.8×3.3 mm) injection molded bars at room temperature with a crosshead speed of 2 in./min (50.8 mm/min) for glass filled samples and 0.2 in/min (5.08 mm/min) for unfilled samples by using ASTM D648. Multiaxial impact testing (MAI), sometimes referred to as instrumented impact testing, was done as per ASTM D3763 using a 4×⅛ inch (101.6×3.2 mm) molded discs. The total energy absorbed by the sample is reported as ft-lbs or J. Testing was done at room temperature on as molded or oven aged samples. Heat Deflection Temperature was tested on five bars having the dimensions 5×0.5×0.125 inches (127×12.7×3.2 mm) using ASTM method D648. Optical properties such as Haze and Transmission were measured by the ASTM method D1003. Scratch Testing was measured using the Pencil Hardness Test according to ASTM D3363-92a, which describes a procedure for rapid, inexpensive determination of the film hardness of an organic coating on a substrate in terms of drawing leads or pencil leads of known hardness ranging in order of softest to hardest: 6B, 5B, 4B, 3B, 2B, B, HB, F, H, 2H, 3H, 4H, 5H, 6H. In the method, a coated panel (or other test substrate) is placed on a firm horizontal surface. The pencil is held firmly against the film at a 45 degree angle (with the point directed away from the operator) and pushed away from the operator in a single stroke of 6.5 mm in length. The process is started with the hardest pencil and continued down the scale of hardness to either of two end points; one, the pencil that will not cut into or gouge the film (pencil hardness), or two, the pencil that will not scratch the film (scratch hardness). Higher pencil hardness and shallower scratches (lower scratch depths) indicate better scratch resistance. A synopsis of all the relevant tests and test methods is given in Table 12.

TABLE 12

| Test Methods and Descriptions | | | |
|---|---|---|---|
| | Test Standard | Default Specimen Type | Units |
| ASTM HDT Test | ASTM D648 | Bar - 127 × 12.7 × 3.2 mm | ° C. |
| ASTM Izod at Room Temperature | Notched ASTM D256 | Bar - 63.5 × 12.7 × 3.2 mm | J/m |
| ASTM Multiaxial Impact | ASTM D3763 | Disk - 101.6 mm dia × 3.2 mm thick | J |

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A composition comprising a thermoplastic resin composition derived from
   (a) a polyester consisting of units of at least one cycloaliphatic diol, aromatic diacid, and optionally an additional diol, wherein the at least one cycloaliphatic diol comprises cyclohexane dimethanol and wherein the at least one cycloaliphatic diol and the additional diol are not tetramethyl cyclobutane diol;

(b) a polycarbonate polymer derived from
   (i) at least from 20 mole percent to 50 mole percent of an aromatic diol derived from structure II

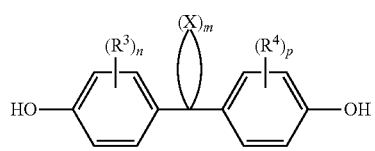

(II)

wherein $R^3$ and $R^4$ are independently selected from the group consisting of $C_1$-$C_{30}$ aliphatic, $C_2$-$C_{30}$ cycloaliphatic and $C_2$-$C_{30}$ aromatic groups, X is $CH_2$ and m is an integer from 3 to 7, n is an integer from 1 to 4, p is an integer from 1 to 4 and
   (ii) from 50 mole percent to 80 mole percent of a second aromatic dihydroxy compound; and (c) optionally, a thermoplastic resin C, different from the polyester and the polycarbonate polymer, that is selected from the group consisting of homopolycarbonate, a poly(estercarbonate), a poly(arylatecarbonate) and combinations thereof;

wherein the thermoplastic resin composition is transparent and has a transmission of at least 70% and a haze less than 10%.

2. The composition of claim 1, wherein the second aromatic dihydroxy compound is of the formula HO-D-OH, wherein D has the structure of formula (III):

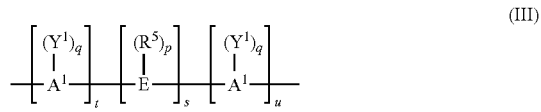

(III)

wherein $A^1$ represents an aromatic group; E comprises a sulfur-containing linkage, sulfide, sulfoxide, sulfone; a phosphorus-containing linkage, phosphinyl, phosphonyl; an ether linkage; a carbonyl group; a tertiary nitrogen group; a silicon-containing linkage; silane; siloxy; a cycloaliphatic group; cyclopentylidene, 3,3,5-trimethylcyclohexylidene, methylcyclohexylidene, 2-[2.2.1]-bicycloheptylidene, neopentylidene, cyclopentadecylidene, cyclododecylidene, adamantylidene; an alkylene or alkylidene group, which group may optionally be part of one or more fused rings attached to one or more aromatic groups bearing one hydroxy substituent; an unsaturated alkylidene group; or two or more alkylene or alkylidene groups connected by a moiety different from alkylene or alkylidene and selected from the group consisting of an aromatic linkage, a tertiary nitrogen linkage; an ether linkage; a carbonyl linkage; a silicon-containing linkage, silane, siloxy; a sulfur-containing linkage, sulfide, sulfoxide, sulfone; a phosphorus-containing linkage, phosphinyl, and phosphonyl;

$R^5$ independently at each occurrence comprises a monovalent hydrocarbon group, aliphatic, aromatic, or a cycloaliphatic radical;

$Y^1$ independently at each occurrence is selected from the group consisting of an inorganic atom, a halogen; an inorganic group, a nitro group; an organic group, a monovalent hydrocarbon group, alkenyl, allyl, alkyl, aryl, aralkyl, alkaryl, cycloalkyl, and an alkoxy group;

the letter "q" represents any integer from and including zero through the number of replaceable hydrogens on $A^1$ available for substitution;

the letter "p" represents an integer from and including zero through the number of replaceable hydrogens on E available for substitution;

the letter "t" represents an integer equal to at least one;

the letter "s" represents an integer equal to either zero or one;

"u" represents any integer including zero; and wherein D is not a 1,1-bis(4'-hydroxy-3'-methylphenyl) cyclohexane.

3. The composition of claim 1, wherein the second aromatic dihydroxy compound is selected from the group consisting of 4,4'-(3,3,5-trimethylcyclohexylidene)diphenol, 4,4'-bis(3,5-dimethyl)diphenol, 4,4'-[1-methyl-4-(1-methylethyl)-1,3-cyclohexandiyl]bisphenol, 4-[1-[3-(4-hydroxyphenyl)-4-methylcyclohexyl]-1-methyl-ethyl]-phenol, 3,8-dihydroxy-5a,10b-diphenylcoumarano-2',3',2,3-coumarane, 2-4,4-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane, 2,2-bis(3-phenyl-4-hydroxyphenyl)propane, 2,2-bis(4-hydroxy-3-methylphenyl)propane, 2-hydrocarbyl-3,3-bis(4-hydroxyaryl)phthalimidine, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, 2,2-bis(4-hydroxyphenyl)-1-phenylpropane, 2,4'-dihydroxyphenyl sulfone, 4,4'-dihydroxydiphenylsulfone, 9,9-bis(4-hydroxyphenyl)fluorene, 4,4' dihydroxy-1,1'-biphenyl, 2,6-dihydroxy naphthalene; hydroquinone; resorcinol, $C_{1-3}$ alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi[1H-indene]-6,6'-diol.

4. The composition of claim 1, wherein the second aromatic dihydroxy compound is bisphenol A.

5. The composition of claim 1, wherein the aromatic diacid is selected from the group consisting of terephthalic acids, isophthalic acids, phthalic acids, naphthalic acids, decahydro naphthalene dicarboxylic acids, stilbene dicarboxylic acid, and combinations thereof.

6. The composition of claim 1, wherein the additional diol is present, and is selected from the group consisting of ethylene glycol, propylene glycol, butanediol, pentane diol; dipropylene glycol; 2-methyl-1,5-pentane diol; 1,6-hexane diol; dimethanol decalin, dimethanol bicyclo octane; triethylene glycol; 1,10-decane diol; tricyclodecane dimethanol; hydrogenated bisphenol-A, tetramethyl cyclobutane diol and combinations thereof.

7. The composition of claim 6, wherein the additional diol is present in an amount ranging from more than 0 to 75 mole percent, based on the total amount of diol.

8. The composition of claim 1, wherein the polyester consists of units of cyclohexane dimethanol, aromatic diacid, and ethylene glycol.

9. The composition of claim 8, wherein the cyclohexane dimethanol is present in an amount from more than 0 to less than 50 mole percent based on the total amount of diol in the polyester.

10. The composition of claim 8, wherein the cyclohexane dimethanol is present in an amount from at least 10 to 100 mole percent of the total amount of the diol in the polyester.

11. The composition of claim 1, wherein the polyester is present in an amount from 5 to 95 weight percent based on the total weight of the composition.

12. The composition of claim 1, wherein the polyester is present in an amount ranging from 5 to 25 weight percent based on the total weight of the composition.

13. The composition of claim 1, wherein the polycarbonate polymer is present in an amount ranging from 5 to 95 weight percent based on the total weight of the composition.

14. The composition of claim 1, wherein the thermoplastic resin C is present in an amount ranging from more than 0 to 60 weight percent based on the total weight of the composition.

15. The composition of claim 1, wherein the thermoplastic resin C is present in an amount ranging from more than 0 to 25 weight percent, based on the total weight of the composition.

16. The composition of claim 1, wherein the composition further comprises an additive.

17. The composition of claim 16, wherein the additive is selected from the group consisting of anti-oxidants, flame retardants, quenchers, fillers, flow modifiers, impact modifiers, colorants, mold release agents, UV light stabilizers, heat stabilizers, lubricants, antidrip agents and combinations thereof.

18. The composition of claim 16, wherein the additive is present in an amount ranging from about more than 0 to 70 weight percent, based on the total weight of the thermoplastic resin.

19. The composition of claim 1, wherein the composition of matter further comprises a filler selected from the group consisting of calcium carbonate, mica, kaolin, talc, glass fibers, carbon fibers, carbon nanotubes, magnesium carbonate, sulfates of barium, calcium sulfate, titanium, nano clay, carbon black, silica, hydroxides of aluminum, hydroxides of ammonium, hydroxides of magnesium, zirconia, nanoscale titania, or a combination thereof.

20. The composition of claim 19, wherein the filler is present in an amount ranging from more than 0 to 40 weight percent filler, based on the total weight of the polyester.

21. An article molded from the composition of claim 1.

22. The article of claim 21, wherein the article is an extruded film, blow molded article, at least one fiber, extruded sheet, and combinations thereof.

23. A composition comprising a thermoplastic resin composition derived from
(a) from 10 to 70 weight percent of a polyester consisting of units of a cyclohexane dimethanol and terephthalic acid;
(b) from 10 to 70 weight percent of a polycarbonate polymer derived from
(i) at least from 20 mole percent to 100 mole percent of an aromatic diol derived from structure II

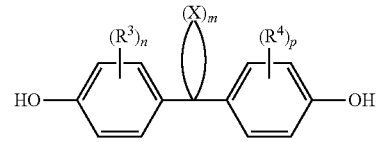

wherein $R^3$ and $R^4$ are independently selected from the group consisting of $C_1$-$C_{30}$ aliphatic, $C_2$-$C_{30}$ cycloaliphatic and $C_2$-$C_{30}$ aromatic groups, X is $CH_2$ and m is an integer from 3 to 7, n is an integer from 1 to 4, p is an integer from 1 to 4 and
(ii) from 0 mole percent to 80 mole percent of an aromatic dihydroxy compound;
(c) from more than 30 to 80 weight percent of a polyester-carbonate polymer comprising isophthalate-terephthalate-resorcinol ester units; and
wherein the thermoplastic resin composition has a transmission of at least 75% and a haze of less than 10%.

24. A composition comprising a thermoplastic resin composition derived from
(a) a polyester consisting of units of cyclohexane dimethanol, aromatic diacid, and ethylene glycol;
(b) a polycarbonate polymer derived from
(i) at least from 20 mole percent to 50 mole percent of an aromatic diol derived from structure II

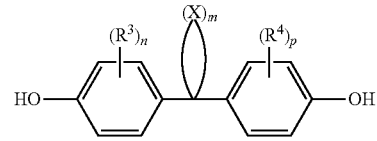

wherein $R^3$ and $R^4$ are independently selected from the group consisting of $C_1$-$C_{30}$ aliphatic, $C_2$-$C_{30}$ cycloaliphatic and $C_2$-$C_{30}$ aromatic groups, X is $CH_2$ and m is an integer from 3 to 7, n is an integer from 1 to 4, p is an integer from 1 to 4 and
(ii) from 50 mole percent to 80 mole percent of a second aromatic dihydroxy compound; and
(c) optionally, a thermoplastic resin C, different from the polyester and the polycarbonate polymer, that is selected from the group consisting of homopolycarbonate, a poly (estercarbonate), a poly(arylatecarbonate) and combinations thereof;
wherein the thermoplastic resin composition is transparent and has a transmission of at least 70% and a haze less than 10%.

* * * * *